(12) United States Patent
Kawabata et al.

(10) Patent No.: US 11,483,490 B2
(45) Date of Patent: Oct. 25, 2022

(54) IMAGE CAPTURING APPARATUS AND ITS CONTROL METHOD

(71) Applicant: CANON KABUSHIKI KAISHA, Tokyo (JP)

(72) Inventors: Kohsuke Kawabata, Tokyo (JP); Tomohiko Takayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/177,329

(22) Filed: Feb. 17, 2021

(65) Prior Publication Data
US 2021/0258466 A1 Aug. 19, 2021

(30) Foreign Application Priority Data

Feb. 19, 2020 (JP) .............................. JP2020-026027
Feb. 19, 2020 (JP) .............................. JP2020-026028

(51) Int. Cl.
*H04N 5/235* (2006.01)
*H04N 5/225* (2006.01)
*H04N 5/232* (2006.01)
*H04N 5/247* (2006.01)
*G06V 20/52* (2022.01)

(52) U.S. Cl.
CPC ......... *H04N 5/2354* (2013.01); *H04N 5/2256* (2013.01); *H04N 5/23296* (2013.01); *H04N 5/23299* (2018.08); *H04N 5/247* (2013.01); *G06V 20/52* (2022.01)

(58) Field of Classification Search
CPC .............. H04N 5/2354; H04N 5/2256; H04N 5/23296; H04N 5/23299; H04N 5/247; H04N 5/23238; H04N 5/2251; G06K 9/00771; G06K 9/2027; F16M 11/06
See application file for complete search history.

(56) References Cited

U.S. PATENT DOCUMENTS

| 9,829,773 | B2 | 11/2017 | Bergsten | |
|---|---|---|---|---|
| 2012/0263447 | A1* | 10/2012 | Fransson | H04N 5/2354 396/164 |
| 2018/0165932 | A1* | 6/2018 | Larsson | G03B 17/12 |

FOREIGN PATENT DOCUMENTS

| JP | 2012222825 A | 11/2012 |
|---|---|---|
| JP | 2015119476 A | 6/2015 |

* cited by examiner

*Primary Examiner* — Yogesh K Aggarwal
(74) *Attorney, Agent, or Firm* — Rossi, Kimms & McDowell LLP

(57) ABSTRACT

An image capturing apparatus includes a plurality of image capturing units each configured to change its position on a circle centered on a first axis, and to rotate around a second axis that is closer to each image capturing unit of the plurality of image capturing units than the first axis and that is parallel to the first axis, a plurality of illumination units configured to emit illumination light in different directions, and a control unit configured to control the plurality of illumination units. The control unit is configured to make the plurality of illumination units emit light, according to a rotation state of the image capturing unit around the second axis.

13 Claims, 21 Drawing Sheets

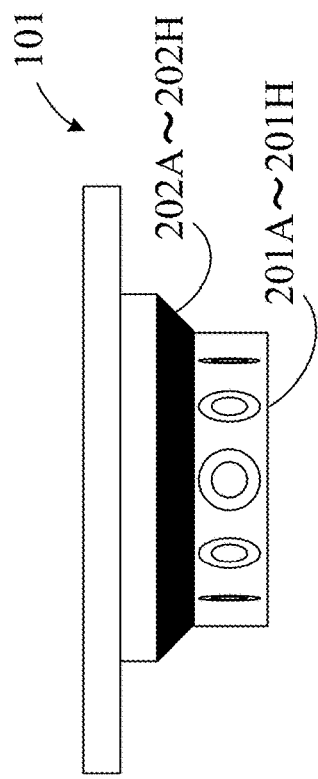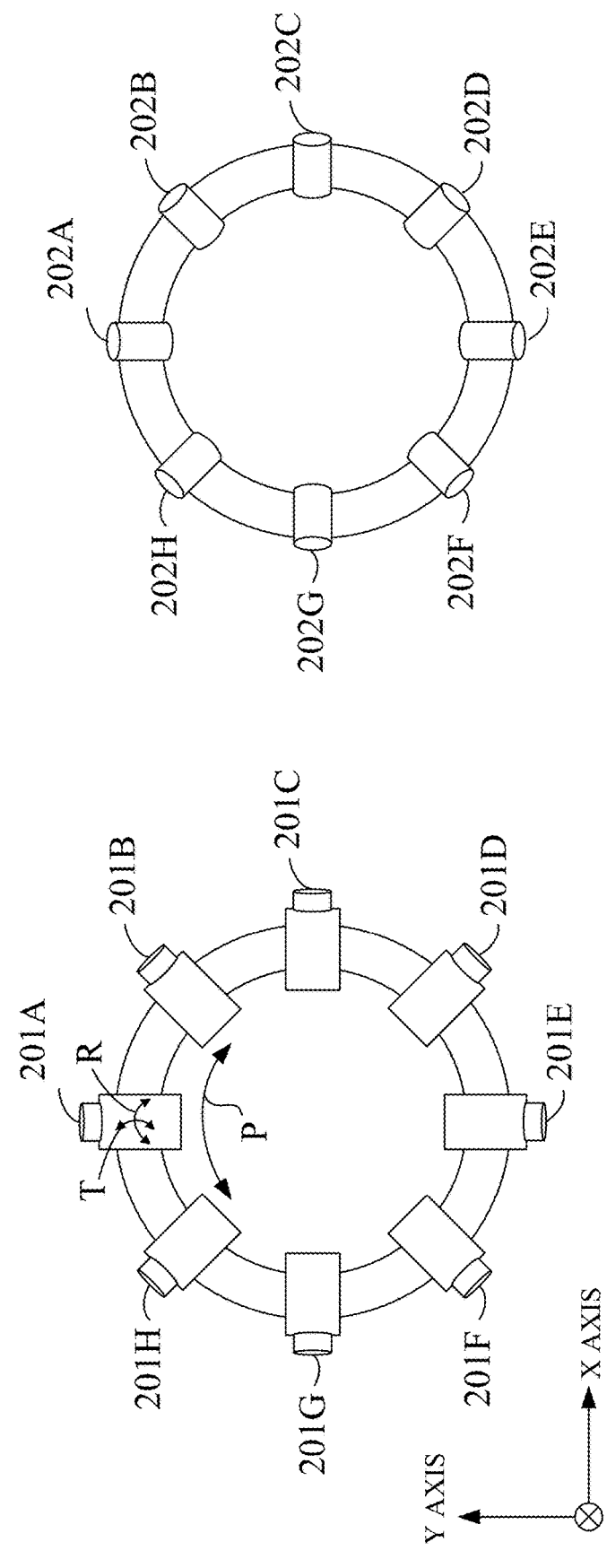

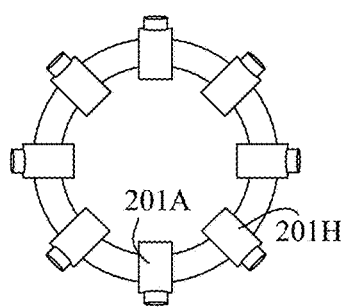
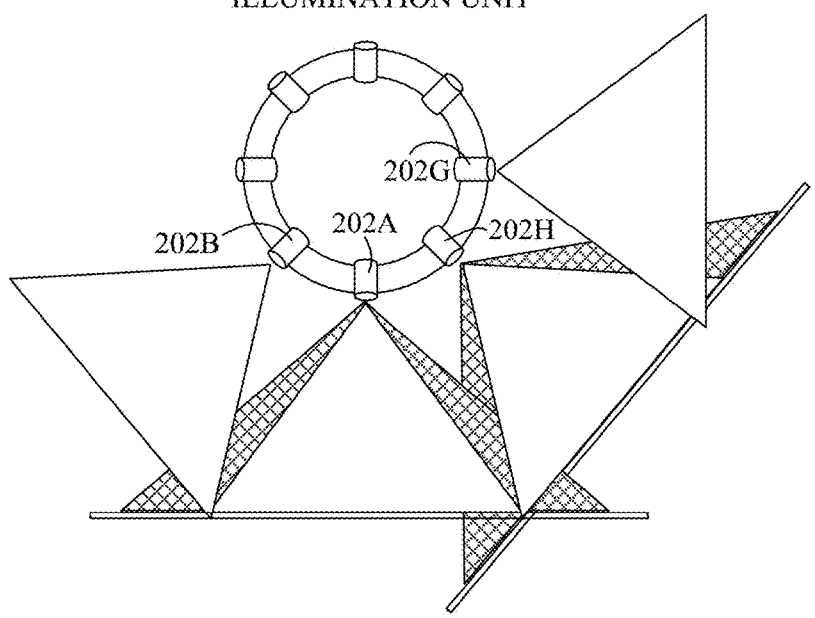
FIG. 6

FIG. 7

| ILLUMINATION AREA | | H | A | B |
|---|---|---|---|---|
| REQUIRED LIGHT AMOUNT | CAMERA 1100 | 100% | 100% | - |
| | CAMERA 1200 | - | 80% | 80% |
| ILLUMINATION AMOUNT | | 100% | 100% | 80% |

IMAGE CAPTURING APPARATUS AND ITS CONTROL METHOD

BACKGROUND OF THE INVENTION

Field of the Invention

The present invention relates to an image capturing apparatus including a plurality of image capturing portions and a plurality of illumination portions.

Description of the Related Art

In image capturing apparatuses such as surveillance cameras which can image a wide range by arranging a plurality of image capturing portions on a circle, some can change a position of each image capturing portion on the circle (that is, the image capturing direction), as disclosed in Japanese Patent Application Laid-Open No. ("JP") 2015-119476. JP 2012-222825 discloses an image capturing apparatus that changes an illumination portion to emit light among a plurality of illumination portions arranged on a circle around a single image capturing portion, according to an image capturing direction of the image capturing portion. It is possible to provide control that emits light from an illumination portion corresponding to a position of an image capturing portion that performs image capturing, when the plurality of image capturing portions disclosed in JP 2015-119476 and the plurality of illumination portions disclosed in JP 2012-222825 are provided.

However, if each image capturing portion can rotate (twist) at each position, by simply emitting light of the illumination portion corresponding to the position of the image capturing portion, an image capturing area of the image capturing portion may not be properly irradiated with the illumination light.

SUMMARY OF THE INVENTION

The present invention provides an image capturing apparatus which can properly irradiate with illumination light, an image capturing area that changes due to twist of each of a plurality of image capturing portions at each position.

An image capturing apparatus according to one aspect of the present invention includes a plurality of image capturing units each configured to change its position on a circle centered on a first axis, and to rotate around a second axis that is closer to each image capturing unit of the plurality of image capturing units than the first axis and that is parallel to the first axis, a plurality of illumination units configured to emit illumination light in different directions, and a control unit configured to control the plurality of illumination units. The control unit is configured to make the plurality of illumination units emit light, according to a rotation state of the image capturing unit around the second axis.

A control method of the above image capturing apparatus and a storage medium storing a computer program that enables a computer to execute the control method also constitute other aspects of the present invention.

Further features of the present invention will become apparent from the following description of exemplary embodiments with reference to the attached drawings.

BRIEF DESCRIPTION OF THE DRAWINGS

FIGS. 2A to 2C are an external view and bottom views each illustrating the image capturing apparatus according to the first embodiment.

FIG. 6 is a diagram illustrating an image capturing area and an illumination area when an illumination unit is repeatedly selected in the image capturing apparatus according to the first embodiment.

FIG. 7 is a diagram illustrating selection state of the illumination units according to the first embodiment.

DESCRIPTION OF THE EMBODIMENTS

Referring now to the accompanying drawings, a description will be given of embodiments according to the present invention.

First Embodiment

Figure 1:
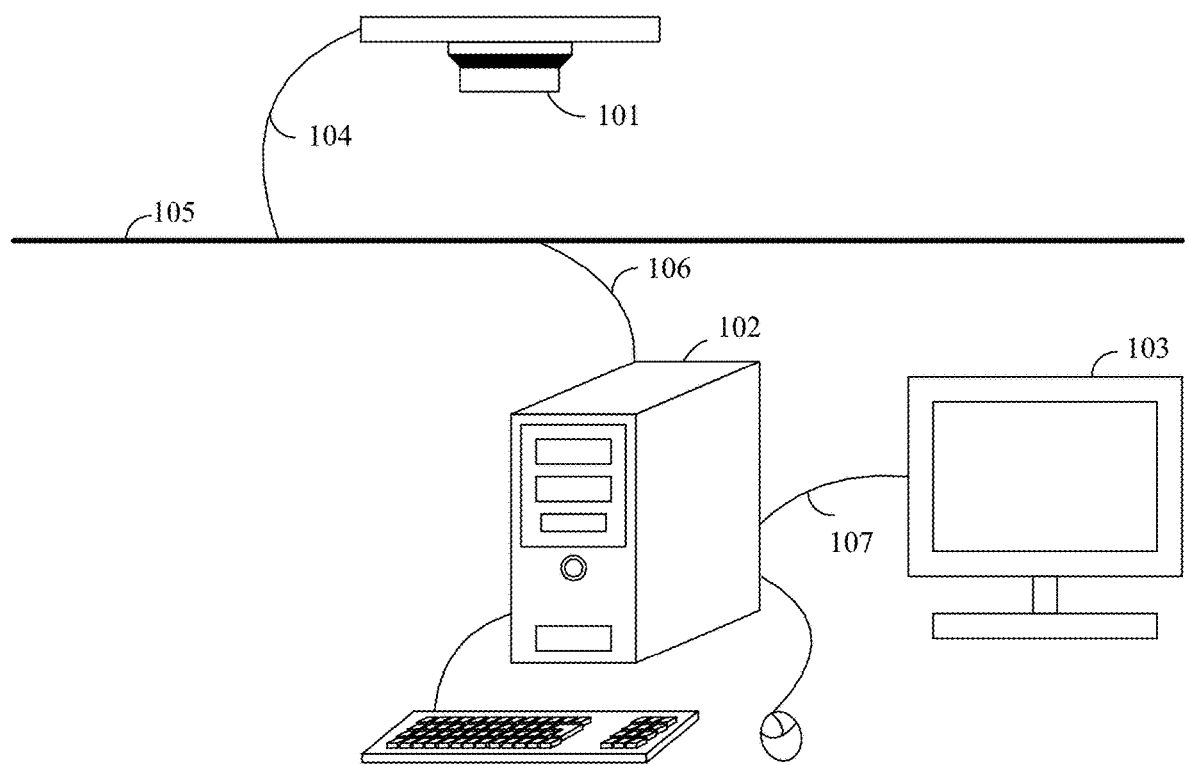
FIG. 1 is a diagram illustrating a configuration of an image capturing system including image capturing apparatus, which is a first embodiment according to the present invention.

FIG. 1 illustrates a configuration of an image capturing system including an image capturing apparatus which is a first embodiment according to the present invention. The image capturing system includes an image capturing apparatus 101 such as a surveillance camera and a network camera, an information processing apparatus 102 which is a personal computer, and a display apparatus 103 as a monitor. The image capturing apparatus 101 and the information processing apparatus 102 are communicably connected via a general-purpose I/F cable 104, a network 105, and a general-purpose I/F cable 106. The information processing apparatus 102 and the display apparatus 103 are connected via a general-purpose I/F cable 107.

The general-purpose I/F cables 104 and 106 are LAN (Local Area Network) cables such as twisted pair cables and optical fiber cables that comply with a communication standard such as Gigabit Ethernet®. The image capturing apparatus 101 and the information processing apparatus 102 may be configured to be communicable by using a wireless LAN instead of the LAN cable. The network 105 is a LAN or WAN (Wide Area Network) including a router, switch, cable, and the like.

FIG. 2A illustrates an external view of the image capturing apparatus 101 viewed from a side (X-axis or Y-axis direction), and FIGS. 2B and 2C respectively illustrate image capturing units 201A to 201H and illumination units 202A to 202H, viewed from a lower side (Z-axis direction) of FIG. 2A.

As illustrated in FIG. 2B, the image capturing apparatus 101 includes the image capturing units 201A to 201H as a plurality of (eight in this embodiment) image capturing units arranged at different positions on the same circle in an arrangement plane which is an XY plane (horizontal plane). As illustrated in FIG. 2C, the image capturing apparatus 101 includes illumination units 202A to 202H as a plurality of (eight) illumination units arranged at different positions on the same circle in an outer circumference of the image capturing units 201A to 201H in a plane parallel to the arrangement plane. The image capturing apparatus 101 can capture an image of a wide area illuminated by illumination light from the eight illumination units 202A to 202H, by using the eight image capturing units 201A to 201H.

Each of the eight image capturing units 201A to 201H can change its position (panning angle) in the arrangement plane in a circumferential direction of the circle, and can change its orientation (tilt angle as a tilt state and twist angle as a twist state). In FIG. 2B, an arrow P represents panning (also referred to as shift) around a center of the circle in the arrangement plane, an arrow T represents tilt as an inclination around an axis parallel to the arrangement plane, and an arrow R represents twist as rotation. Twist indicates a rotation around a twist axis that is orthogonal to the arrangement plane and that is located at a position closer than the center of the circle from an image capturing unit (inside the image capturing unit in this embodiment). Each of the image capturing units 201A to 201H can twist around the twist axis at each position. In other words, panning (shift) changes the image capturing direction by moving the image capturing unit around the center of the circle, and twist changes the image capturing direction of the image capturing unit at a fixed position.

Each of the eight illumination units 202A to 202H illustrated in FIG. 2C has a fixed position and a fixed orientation in a circumferential direction of the circle. In an initial state, the positions of the image capturing unit 201A and the illumination unit 202A in the circumferential direction match in the XY plane, and the positions of the other seven image capturing units 201B to 201H and the illumination units 202B to 202H in the circumferential direction similarly match, respectively.

The image capturing apparatus 101 is configured to transmit image data, which is generated by capturing an image of an image capturing area by each image capturing unit, to the information processing apparatus 102 via the general-purpose (PC) cable 104, the network 105, and the general-purpose I/F cable 106. The image capturing apparatus 101 is also configured to transmit image capturing set data such as a panning angle, tilt angle, twist angle, zooming magnification, focus position, exposure, and white balance of each image capturing unit to the information processing apparatus 102 together with the image data.

The information processing apparatus 102 includes a personal computer (PC) or a workstation, and is configured to acquire the image data and the image capturing set data each of which is transmitted from the image capturing apparatus 101, and to make the display apparatus 103, such as a liquid crystal display, display a motion image corresponding to the image data and information corresponding to image capturing set data. The information processing apparatus 102 is configured to control the image capturing apparatus 101 by transmitting an image capturing control command including a panning angle, tilt angle, twist angle, zooming magnification, focus position, exposure, white balance, and the like to the image capturing apparatus 101.

The image capturing system is configured as a client-server system with the image capturing apparatus 101 as a server and the information processing apparatus 102 as a client. The image capturing apparatus 101 may be connected to a plurality of information processing apparatuses, and the plurality of information processing apparatuses may acquire the motion image data from the image capturing apparatus 101. By transferring a control right for the image capturing apparatus 101 between the plurality of information processing apparatuses, the plurality of information processing apparatuses may control the image capturing apparatus 101.

As the information processing apparatus 102, one having a display apparatus integrally, such as a notebook PC or a tablet terminal, may be used, or a function of the information processing apparatus 102 may be incorporated into the image capturing apparatus 101.

Figure 3:
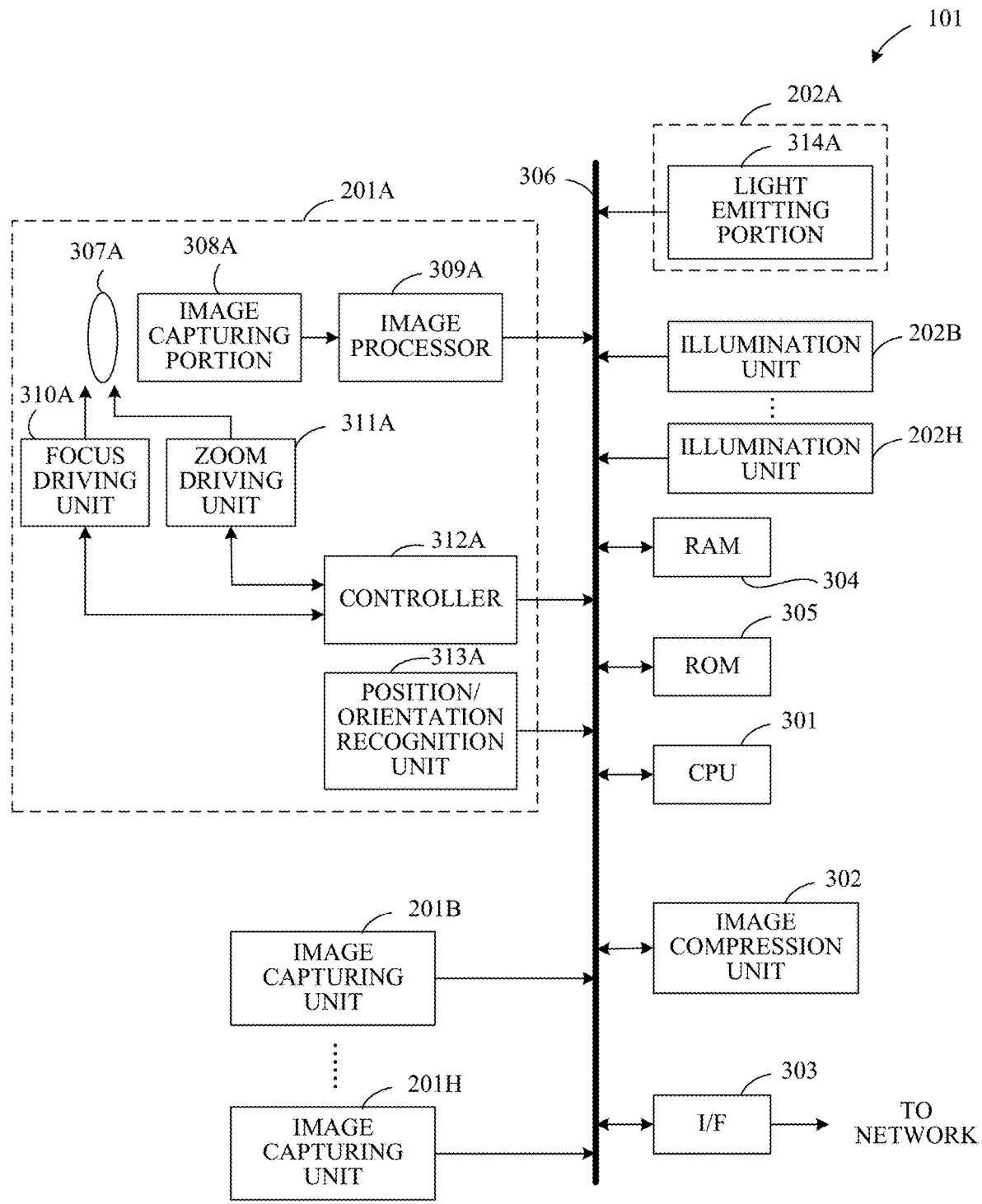
FIG. 3 is a block diagram illustrating an electrical configuration of the image capturing apparatus according to the first embodiment.

FIG. 3 illustrates an electrical configuration of the image capturing apparatus 101. The image capturing apparatus 101 includes a CPU (control unit) 301, an image compression unit 302, a ROM 305, a RAM 304, and an I/F 303 in addition to the above-mentioned plurality of image capturing units 201A to 201H and plurality of illumination units 202A to 202H.

The image capturing unit 201A includes an optical system 307A, an image capturing portion 308A, an image processor 309A, a focus driving unit 310A, a zoom driving unit 311A, a controller 312A, and a position/orientation recognition unit 313A. The controller 312A is configured to control the zoom driving unit 311A in response to the command for the zooming magnification from the information processing apparatus 102, and to make the zoom driving unit 311A move a zoom lens (not illustrated) in the optical system 307A to perform zooming (zoom-in and zoom-out) in the optical axis direction. The controller 312A is configured to control the focus driving unit 310A in response to the command for the focus position from the information processing apparatus 102, and to make the focus driving unit 310A move a focus lens (not illustrated) in the optical system 307A to the optical axis direction to perform focusing on the instructed focus position.

The image capturing portion 308A includes an image sensor, such as a CCD sensor or a CMOS sensor, that captures (photoelectrically converts) an optical image formed by the optical system 307A. The image capturing portion 308A outputs RAW data generated by capturing an image to the image processor 309A. The image processor 309A is configured to generate image data by performing various image processing such as black correction processing, demosaicing processing, and filter processing on the RAW data from the image capturing portion 308A, and to transfer and store the image data in the RAM 304 via a bus 306.

The position/orientation recognition unit (detection unit) 313A is configured to detect the position (panning angle) and orientation (tilt angle and twist angle) of the image capturing unit 201A and to generate position/orientation information. The position and orientation may be detected by using an encoder, a gyro sensor, an angular acceleration sensor, or the like. The position/orientation information of the image capturing unit 201A is processed by the CPU 301 and is stored in the RAM 304 as information on an image capturing direction and image capturing angle of view of the image capturing unit 201A. The configurations of the other image capturing units 201B to 201H are the same as those of the image capturing unit 201A.

The illumination unit 202A includes a light emitting portion 314A including a light emitting element such as an LED. The light emitting portion 314A can change its light emission intensity. The configurations of the other illumination units 202B to 202H are the same as those of the illumination unit 202A.

The CPU 301 as a computer is configured to execute processing of sequentially transferring image data from the image capturing units 201A to 201H to the image compression unit 302 and of transferring the image data to the network 105 via the I/F 303. The CPU 301 is configured to calculate the image capturing direction and image capturing area of each image capturing unit based on the position/orientation information of each image capturing unit. At this time, the CPU 301 calculates the image capturing area by referring to the zooming magnification of each image capturing unit. The CPU 301 is also configured to select an illumination unit to emit light from the illumination units 202A to 202H, and to control the selected illumination unit.

The ROM 305 is a non-volatile memory such as an EEPROM or a flash memory, and is configured to store a computer program and data used by the CPU 301. The program and data are imported into the RAM 304, which is a volatile memory such as a SRAM or DRAM, via the bus 306, and thereafter are used by the CPU 301.

The I/F 303 is connected to an input apparatus such as a push key including a release switch and a power switch, a cross key, a joystick, a touch panel, a keyboard and a pointing device such as a mouse, and is configured to receive an instruction from the input apparatus, and to notify the CPU 301 of the instruction via the bus 306. The I/F 303 is connected to the network 105 via the above-mentioned wired or wireless LAN.

The image compression unit 302 is configured to perform compression processing that complies with a standard such as JPEG, MOTION-JPEG, MPEG2, AVC/H.M. 264, AVC/H 265, or the like on the image data output from each image capturing unit in response to a control instruction from the CPU 301 via the bus 306, and to generate compressed image data. The compressed image data is transmitted to the network 105 and the information processing apparatus 102 via the I/F 303.

Figure 4:
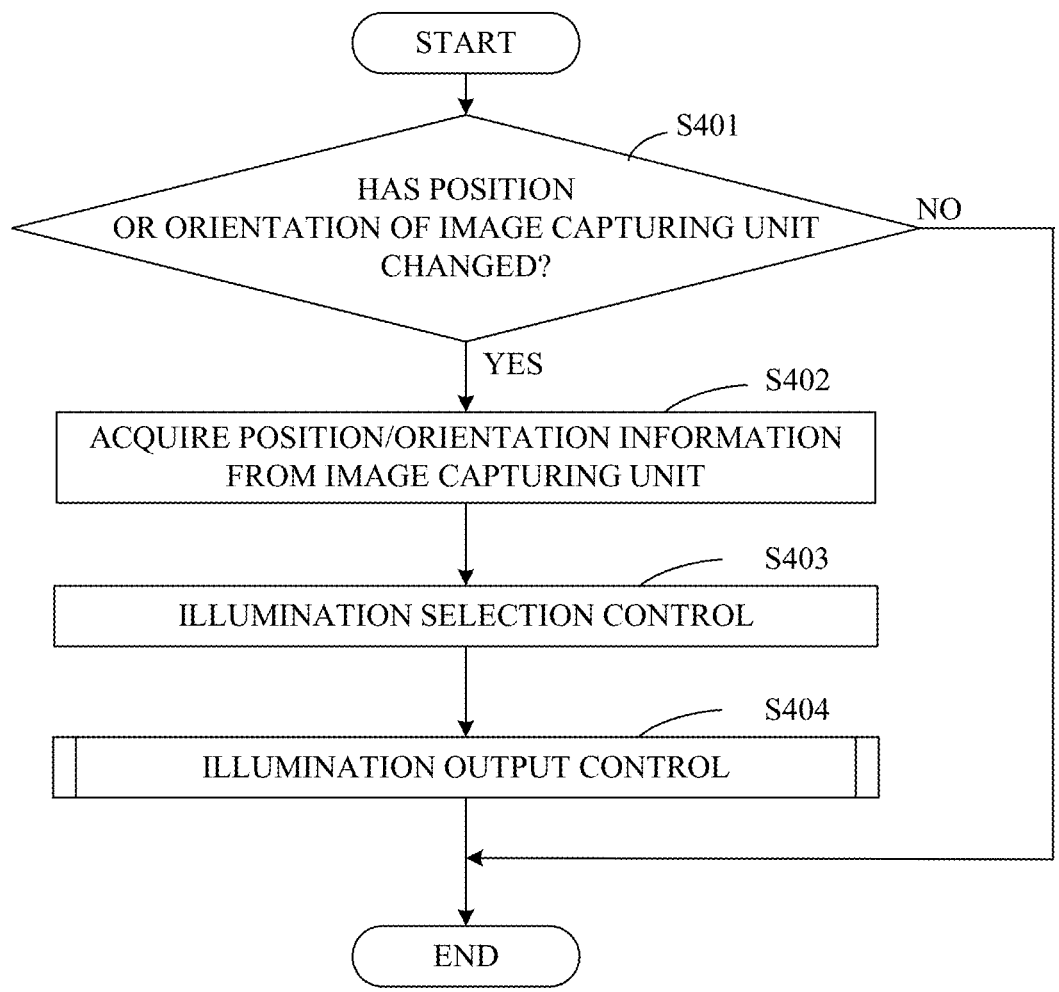
FIG. 4 is a flow chart illustrating illumination control processing in the image capturing apparatus according to the first embodiment.

The flow chart of FIG. 4 illustrates illumination control processing (control method) executed by the CPU 301 according to a computer program. In step S401, the CPU 301 determines whether or not the position or orientation of any of the image capturing units 201A to 201H has changed. The image capturing area of any of the image capturing units may be blocked by an obstacle such as a wall located near an installation position at which the image capturing apparatus 101 is installed. In order to avoid such a situation and to ensure a proper image capturing area for each image capturing unit, the position and orientation of the image capturing unit are changed manually by the user or automatically by the CPU 301. When the position or orientation of any image capturing unit has changed in this way, the CPU 301 proceeds to S402, and when the position and orientation has not changed, this processing ends.

In step S402, the CPU 301 acquires position/orientation information from each of the image capturing units 201A to 201H. That is, the CPU 301 acquires the position (panning angle) and orientation (tilt angle and twist angle) of each image capturing unit.

Subsequently, in step S403, the CPU 301 performs illumination selection control. Specifically, the CPU 301 calculates the image capturing direction and image capturing area of the image capturing unit that captures an image based on the acquired position/orientation information, and selects an illumination unit to emit light from the illumination units 202A to 202H, according to the image capturing direction and the image capturing area. At this time, the CPU 301 selects the illumination unit to emit light so that the illumination light illuminates the entire area of the image capturing area.

Subsequently, in step S404, the CPU 301 controls illumination output so that the illumination unit selected in step S403 emits light. Specifically, the CPU 301 controls output (light emission intensity) of each illumination unit, according to a logical sum of selection state of emission/non-emission of the illumination units for each of the image capturing units 201A to 201H. A detailed description will be given later of the illumination output control in this step.

With the above illumination control processing, it is possible to properly irradiate the image capturing area with the illumination light that changes due to the twist of the image capturing unit.

Figure 5A:
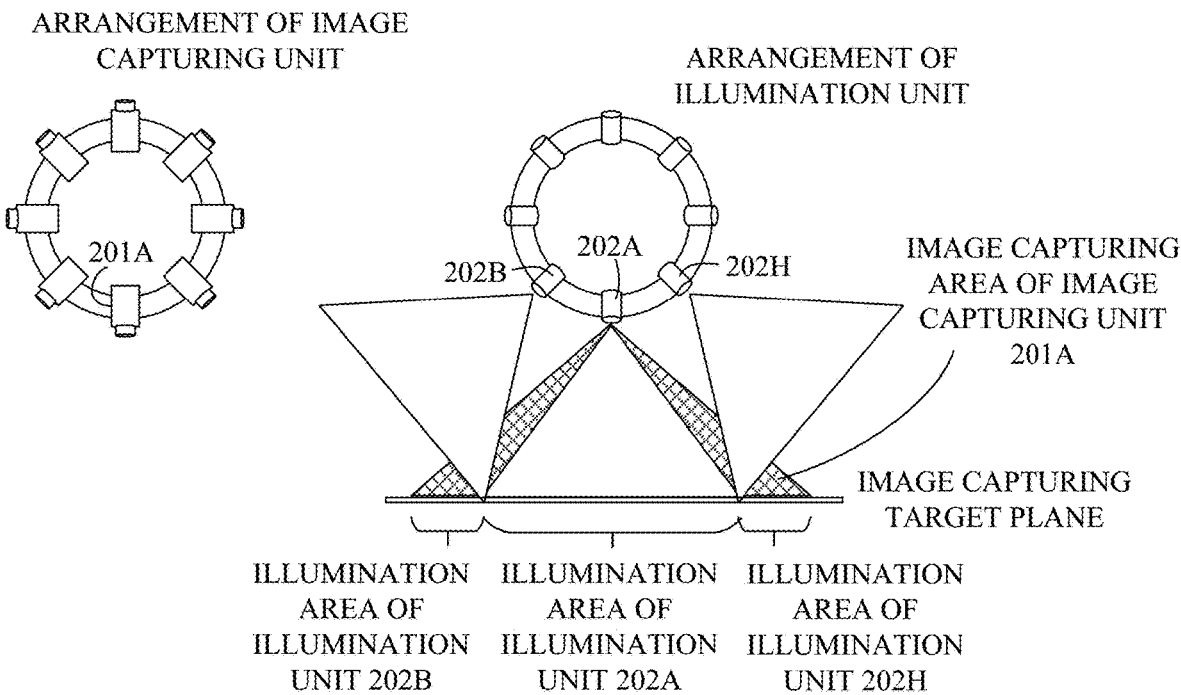
FIGS. 5A and 5B are diagrams each illustrating an image capturing area and an illumination area in the image capturing apparatus according to the first embodiment.
Figure 5B:
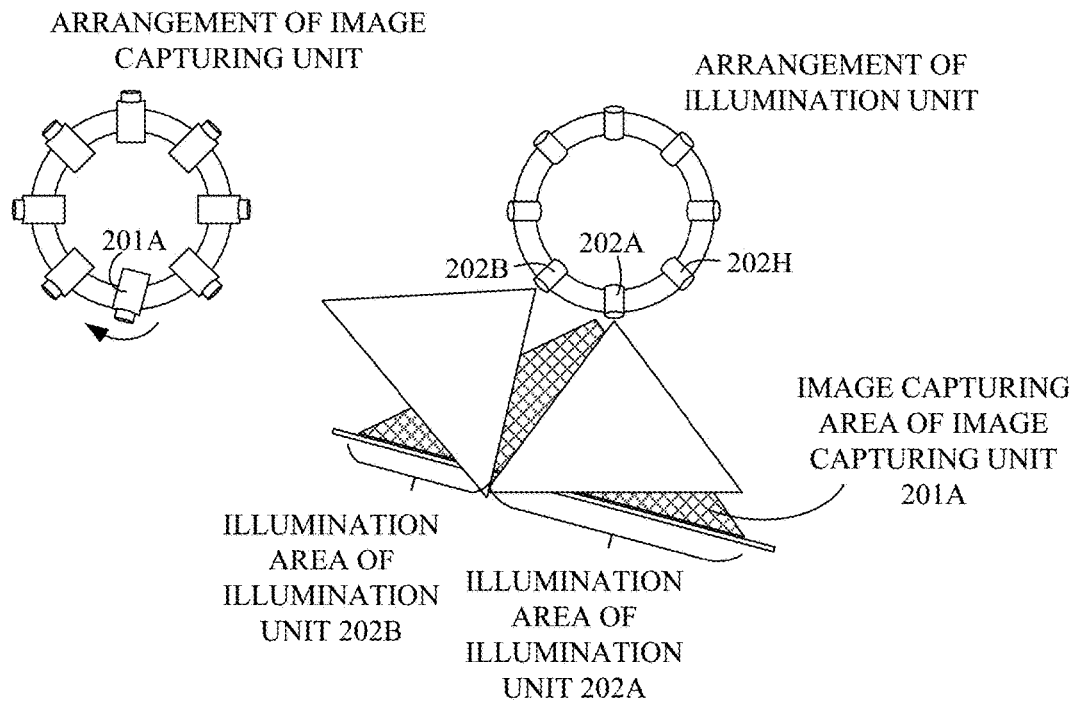

Each of FIGS. 5A and 5B illustrates a relationship between the image capturing area in a plane parallel to the arrangement plane and the illumination area of the illumination light from the illumination unit. Left side of FIG. 5A illustrates an arrangement of the image capturing unit in the arrangement plane, and in the figure, the image capturing unit 201A captures an image. Right side of FIG. 5A illustrates an arrangement of the illumination units in the plane parallel to the arrangement plane, and represents the illumination area of the illumination light from each of the illumination units 202A, 202B, and 202H with an outlined part, and the image capturing area of the image capturing unit 201A with a hatched part. In FIG. 5A, the illumination area of the illumination light from the illumination units 202A, 202B, and 202H covers the entire image capturing area of the image capturing unit 201A on an image capturing target surface on which the image capturing unit 201A is in focus.

In the left side of FIG. 5B, an arrangement of the image capturing unit is illustrated, and the image capturing direction of the image capturing unit 201A is different from that of FIG. 5A. The right side of FIG. 5B illustrates an arrangement of the illumination units, and represents the illumination area of the illumination light from each of the illumination units 202A and 202B with an outlined part, and the image capturing area of the image capturing unit 201A with a hatched part. In FIG. 5B, since the illumination area of the illumination light from the illumination units 202A and 202B covers the entire image capturing area of the image capturing unit 201A, it is not necessary to emit the illumination light from the illumination unit 202H.

As described above, when the illumination unit to emit light is selected according to the image capturing direction and image capturing area of the image capturing unit, it is possible to efficiently and properly irradiate the image capturing area with the illumination light.

A case will be described in which an illumination unit is repeatedly selected for two or more image capturing units with reference to FIG. 6. The left side of FIG. 6 illustrates an arrangement of the image capturing units, in which two adjacent image capturing units 201A and 201H perform image capturing. The right side of FIG. 6 illustrates an arrangement of the illumination units, and represents the illumination area of the illumination light from each of the illumination units 202A, 202B, 202H, and 202G with an outlined part, and the image capturing area of the image capturing unit 201A with a hatched part. In the image capturing target plane of the image capturing unit 201A, the illumination areas of the illumination light from the illumination units 202A, 202B, 202H cover the entire image capturing area of the image capturing unit 201A. In an image capturing target plane of the image capturing unit 201H, the illumination areas of the illumination light from the illumination units 202A, 202H, and 202G cover the entire image capturing area of the image capturing unit 201H.

In the example illustrated in FIG. 6, the illumination units 202A and 202H are repeatedly selected as the illumination units to emit light for both the image capturing units 201A and 201H. Such repeated selections of the illumination units are enabled by controlling the output of each illumination unit according to the logical sum of the selection state of the illumination units for each of the image capturing units 201A to 201H.

The selection state of the illumination unit will be described with reference to FIG. 7. In FIG. 7, "Camera 1" represents an image capturing unit 201A, and similarly, "Camera 2 to 8" represent the image capturing units 201B to 201H. "No. 1" represents the illumination unit 202A, and similarly, "No. 2 to 8" represent the illumination units 202B to 202H. FIG. 7 represents a selection state in which the illumination units 202A, 202B, 202H, and 202G are selected (each marked with a "check" in the figure) as the illumination units to emit light, as illustrated in FIG. 6. That is, the image capturing and illumination state of FIG. 6 can be realized by causing, to emit light, "No. 1", "No. 2", "No. 7" and "No. 8" as a logical sum of "No. 1", "No. 2" and "No. 8" selected for "Camera 1" and "No. 1", "No. 7" and "No. 8" selected for "Camera 8".

Figure 8:
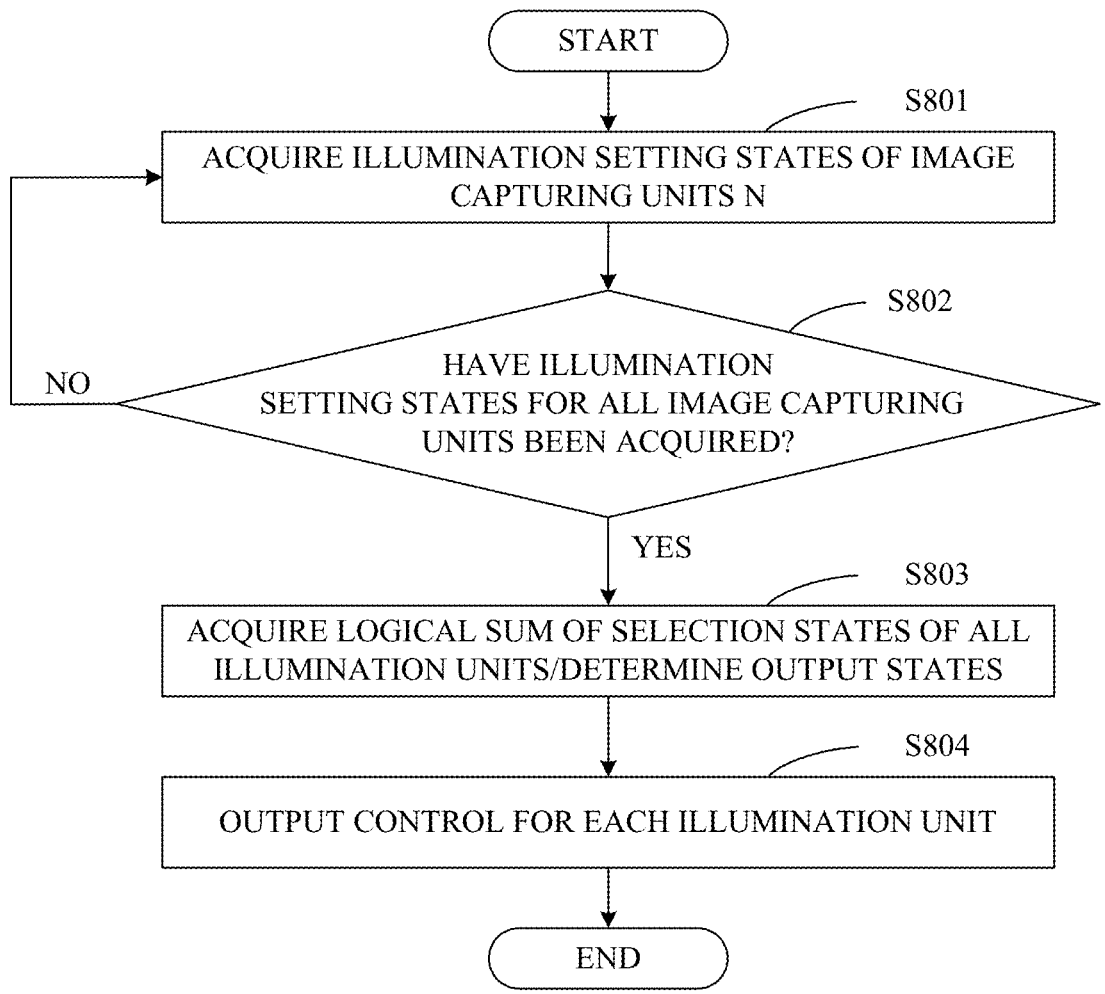
FIG. 8 is a flow chart illustrating illumination output control processing in the image capturing apparatus according to the first embodiment.

The flow chart of FIG. 8 illustrates the illumination output control processing performed by the CPU 301 in step S404 of FIG. 4. In step S801, the CPU 301 acquires illumination setting states of eight image capturing units N (N=201A to 201H). The illumination setting state indicates the selection state of the illumination unit for each image capturing unit. For example, when the user sets the illumination unit to emit light for the image capturing units N in advance via a user interface, the CPU 301 acquires the setting state (selection state) as the illumination setting state.

Subsequently, in step S802, the CPU 301 determines whether or not the illumination setting states for all the image capturing units N have been acquired. When the acquisition of the illumination setting state for all the image capturing units N has not been completed, the CPU 301 returns to S801, and when the acquisition has been completed, the CPU 301 proceeds to S803.

In step S803, the CPU 301 acquires a logical sum of the selection states of all the illumination units M (M=202A to 202H) and determines an output state of each illumination unit. In the example illustrated in FIG. 7, light emissions from the illumination unit 202A (No. 1), illumination unit 202B (No. 2), and illumination unit 202H (No. 8) are selected for the image capturing unit 201A (Cameral), and light emissions from the illumination unit 202A (No. 1), illumination unit 202G (No. 7), and illumination unit 202H (No. 8) are selected for the image capturing unit 201H (Camera8). The CPU 301 determines the light emission from the illumination unit 202A (No. 1), illumination unit 202B (No. 2), illumination unit 202G (No. 7), and illumination unit 202H (No. 8) according to the logical sum of them, and store the determined illumination units to emit light in the RAM 304.

Subsequently, in step S804, the CPU 301 controls the output of the illumination units which are determined to emit light and which are read from the RAM 304. Thereby, the image capturing area of the image capturing units 201A and 201B can be properly irradiated with the illumination light.

Figure 9:
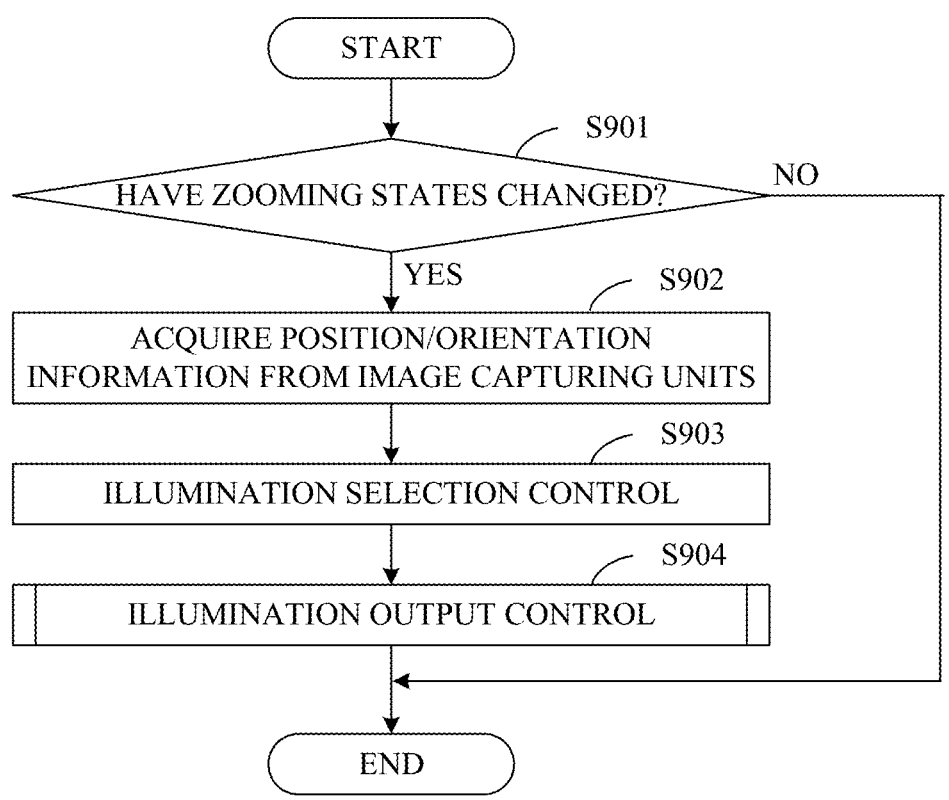
FIG. 9 is a flow chart illustrating illumination control processing according to zoom in the image capturing apparatus according to the first embodiment.

The flow chart in FIG. 9 illustrates illumination control processing performed by the CPU 301 according to zooming (change in a zooming state) of the optical system of each image capturing unit. In step S901, the CPU 301 determines whether or not a zooming state of the optical system of each image capturing unit has changed. For example, when the user wants to zoom in on and image an object of interest, the zooming state changes when the user instructs a zooming magnification via the information processing apparatus 102. When the zooming state has changed, the CPU 301 acquires the changed zooming state and proceeds to step S902. When the zooming state has not changed, the CPU 301 ends this processing.

In step S901, it may be further determined whether or not the positions or orientations of the image capturing units have changed as with step S401 of FIG. 4, and when any of the zooming states, positions, and orientations of the image capturing units has changed, the process may proceed to step S902.

In step S902, the CPU 301 acquires the position/orientation information from each of the image capturing units 201A to 201H.

Subsequently, in step S903, the CPU 301 performs illumination selection control. Specifically, the CPU 301 calculates an image capturing direction and image capturing area of each image capturing unit that performs image capturing, from the acquired position/orientation information and zooming state after the change, and selects an illumination unit to emit light according to the image capturing area and the image capturing direction, the illumination unit being selected from the illumination units 202A to 202H. At this time, the CPU 301 selects the illumination unit to emit light so that the entire image capturing area is irradiated with the illumination light.

Subsequently, in step S904, the CPU 301 controls the illumination output so that the illumination unit selected in step S903 emits light. At this time, as illustrated in FIG. 8, the output to each illumination unit is controlled according to the logical sum of the selection state of the illumination units for each of the image capturing units 201A to 201H.

With the above illumination control processing, it is possible to properly irradiate the image capturing area according to the zooming state of each image capturing unit.

Figure 10:
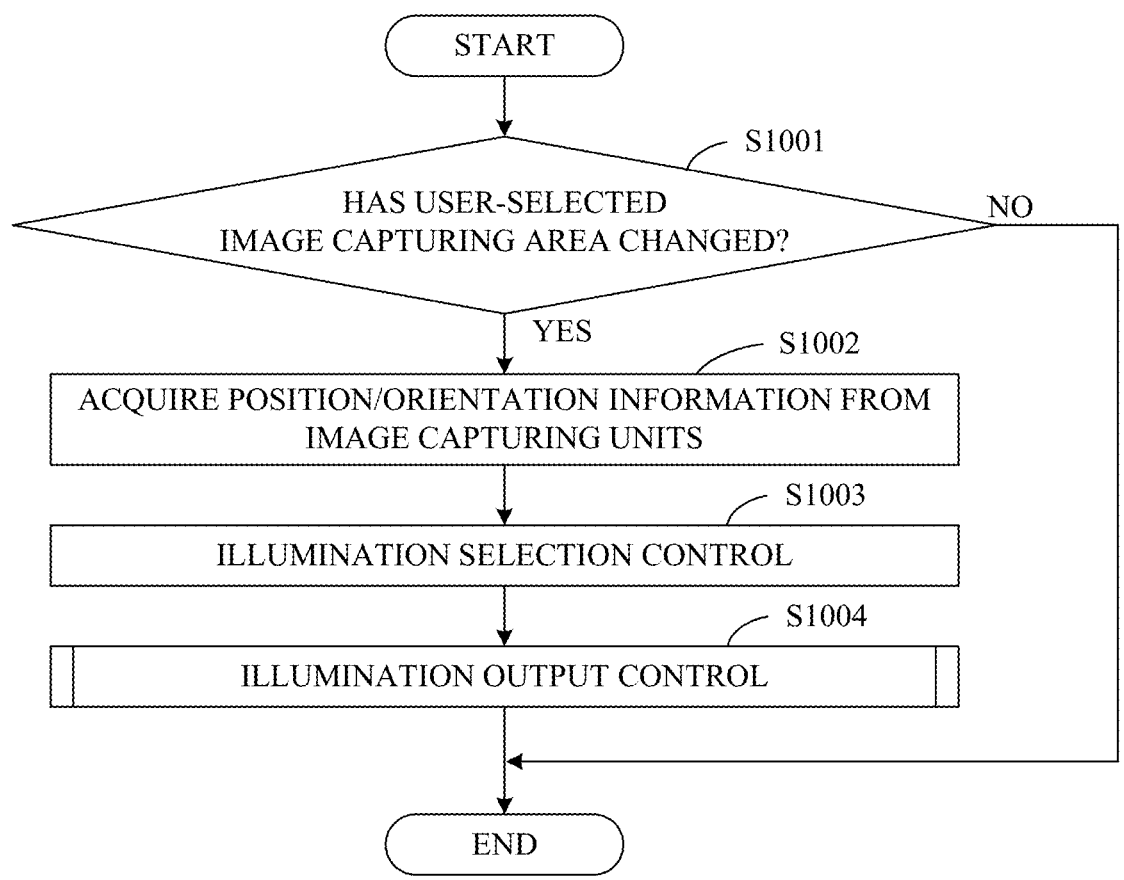
FIG. 10 is a flow chart illustrating illumination control processing according to image capturing area selection in the image capturing apparatus according to the first embodiment.

The flow chart of FIG. 10 illustrates illumination control processing performed by the CPU 301 according to a user's selection of the image capturing area (hereinafter referred to as user-selected image capturing area). When the user wants to capture an image of a specific object only, via the information processing apparatus 102, the user can select a user-selected image capturing area for which high-quality image capturing is performed by setting ROI (Region Of Interest) or the like in an original image capturing area of an arbitrary image capturing unit.

In step S1001, the CPU 301 determines whether or not the user-selected image capturing area has changed. When the user-selected image capturing area has changed, the CPU 301 proceeds to S1002, and when the user-selected image capturing area has not changed, the CPU 301 ends this processing.

In step S1001, it may be further determined whether or not the position, orientation, or zooming state of the image capturing unit has changed as with step S401 of FIG. 4 and step S901 of FIG. 9, and when any of the user-selected image capturing area and the position, orientation, and zooming state of the image capturing unit has changed, the process may proceed to step S1002.

In step S1002, the CPU 301 acquires the position/orientation information from each of the image capturing units 201A to 201H.

Subsequently, in step S1003, the CPU 301 performs illumination selection control. Specifically, the CPU 301 calculates the image capturing direction and image capturing area of the image capturing unit to capture an image from the acquired position/orientation information and the changed user-selected image capturing area, and selects an illumination unit to emit light from the illumination units 202A to 202H according to the image capturing direction and image capturing area. At this time, the CPU 301 selects an illumination unit to emit light so that the entire user-selected image capturing area is irradiated with the illumination light.

Subsequently, in step S1004, the CPU 301 controls illumination output so that the illumination unit selected in step S1003 emits light. At this time, as illustrated in FIG. 8, output to each illumination unit is controlled according to the logical sum of the selection state of the illumination unit for each of the image capturing units 201A to 201H.

With the above illumination control processing, it is possible to properly irradiate the user-selected image capturing area with illumination light.

Second Embodiment

Figure 11:
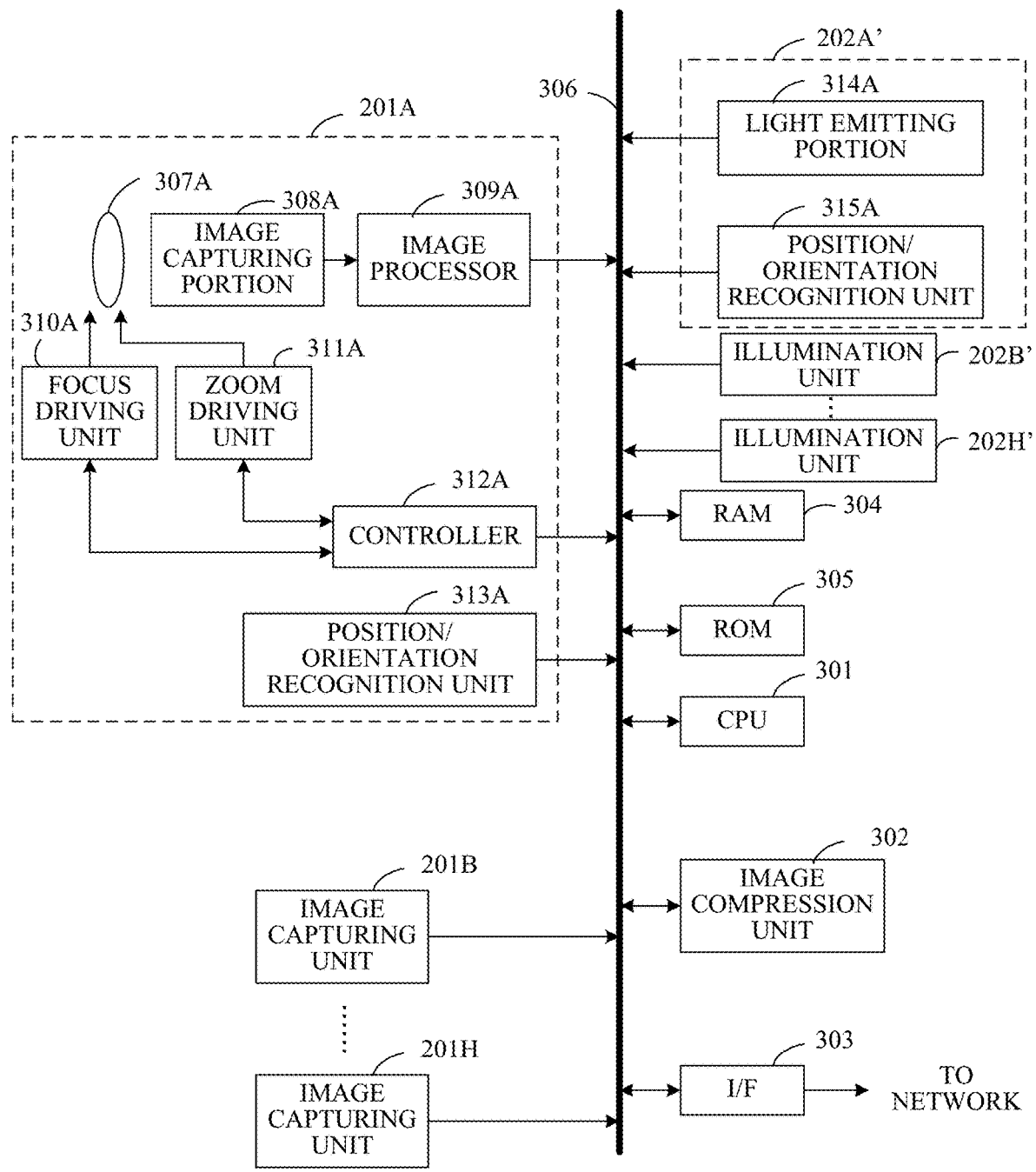
FIG. 11 is a block diagram illustrating an electrical configuration of an image capturing apparatus, which is a second embodiment according to the present invention.

FIG. 11 illustrates a configuration of an image capturing apparatus, which is a second embodiment according to the present invention. The image capturing apparatus according to this embodiment is also used for an image capturing system configured as with that of the first embodiment.

As with the image capturing apparatus according to the first embodiment, the image capturing apparatus according to this embodiment includes a plurality of image capturing units 201A to 201H, a plurality of illumination units 202A' to 202H', a CPU (control unit) 301, an image compression unit 302, a ROM 305, a RAM 304, and an OF 303. A position and an orientation of each of the plurality of illumination units 202A' to 202H' can be changed in the same manner as those of the image capturing units.

The illumination unit 202A' includes a position/orientation recognition unit 315A. The position/orientation recognition unit (detection unit) 315A is configured to detect a position (panning angle) and orientation (tilt angle and twist angle) of the illumination unit 202A', and to generate position/orientation information. The position and orientation may be detected by using an encoder, a gyro sensor, an angular acceleration sensor, or the like. The position/orientation information of the illumination unit 202A' is processed by the CPU 301 and is stored in the RAM 304 as information on an illumination direction and illumination area of illumination light of the illumination unit 202A'. The other illumination units 202B' to 202H' also have position/orientation recognition units, respectively.

Figure 12:
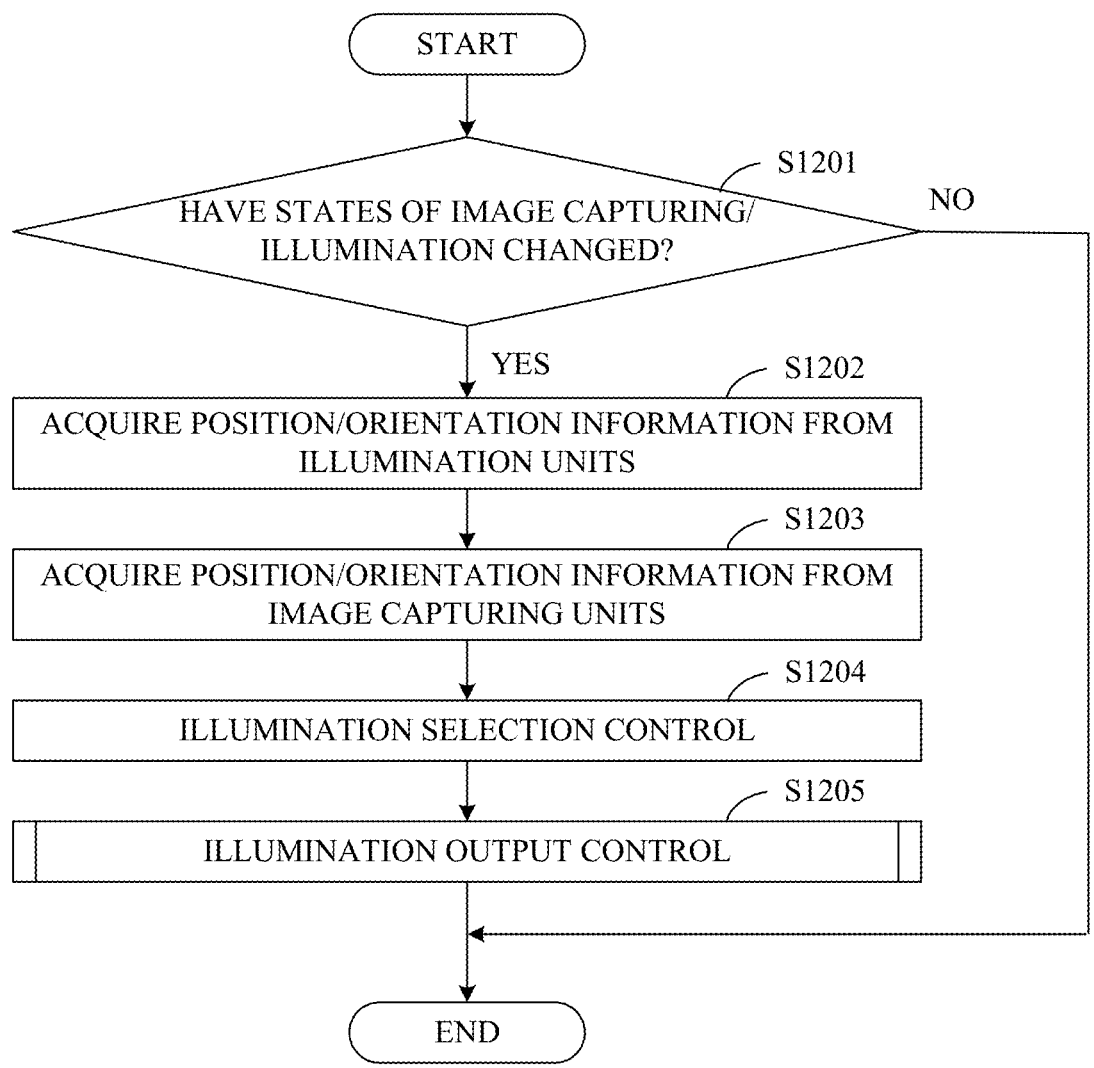
FIG. 12 is a flow chart illustrating illumination control processing in the image capturing apparatus according to the second embodiment.

The flow chart of FIG. 12 illustrates illumination control processing executed by the CPU 301 according to a computer program, in this embodiment. In step S1201, the CPU 301 determines whether or not the position or orientation of any of the image capturing units 201A to 201H and of the illumination units 202A' to 202H' has changed. Changes in the positions and orientations of the image capturing units are caused in the same manner as those explained in the first embodiment, and similarly the positions and orientations of the illumination units are changed. When the position or orientation of any image capturing unit or illumination unit has changed in this way, the CPU 301 proceeds to S1202, and when the position and orientation have not changed, this processing ends.

In step S1202, the CPU 301 acquires position/orientation information from each of the illumination units 202A' to 202 H'. That is, the position, tilt state, and twist state of each illumination unit are acquired.

Subsequently, in step S1203, the CPU 301 acquires position/orientation information from each of the image capturing units 201A to 201H. That is, the position, tilt state, and twist state of each image capturing unit are acquired.

Subsequently, in step S1204, the CPU 301 performs illumination selection control. Specifically, the CPU 301 calculates an illumination direction and illumination area for each illumination unit, and an image capturing direction and image capturing area for each image capturing unit, by using the acquired position/orientation information of the illumination units 202A' to 202H' and of the image capturing units 201A to 201H, and selects an illumination unit to emit light from the illumination units 202A' to 202H' according to the image capturing direction and image capturing area of each image capturing unit. At this time, the CPU 301 selects an illumination unit to emit light so that the entire image capturing area is irradiated with the illumination light.

Subsequently, in step S1205, the CPU 301 performs illumination output control so that the illumination unit selected in step S1204 emits light. Specifically, output to each illumination unit is controlled according to a logical sum of a selection state of emission/non-emission of the illumination unit for each of the image capturing units 201A to 201H. The details of the illumination output control in this step are as illustrated in FIG. 8.

With the above illumination control processing, it is possible to properly irradiate the image capturing area changed by the twist of the image capturing unit with illumination light from the illumination unit selected according to the position and orientation of each illumination unit.

According to the first and second embodiments described above, even if an image capturing area changes due to twist of a plurality of image capturing unit at each position, the image capturing area can be properly irradiated with illumination light from any of a plurality of illumination units, and good image capturing can be performed.

Third Embodiment

Figure 13:
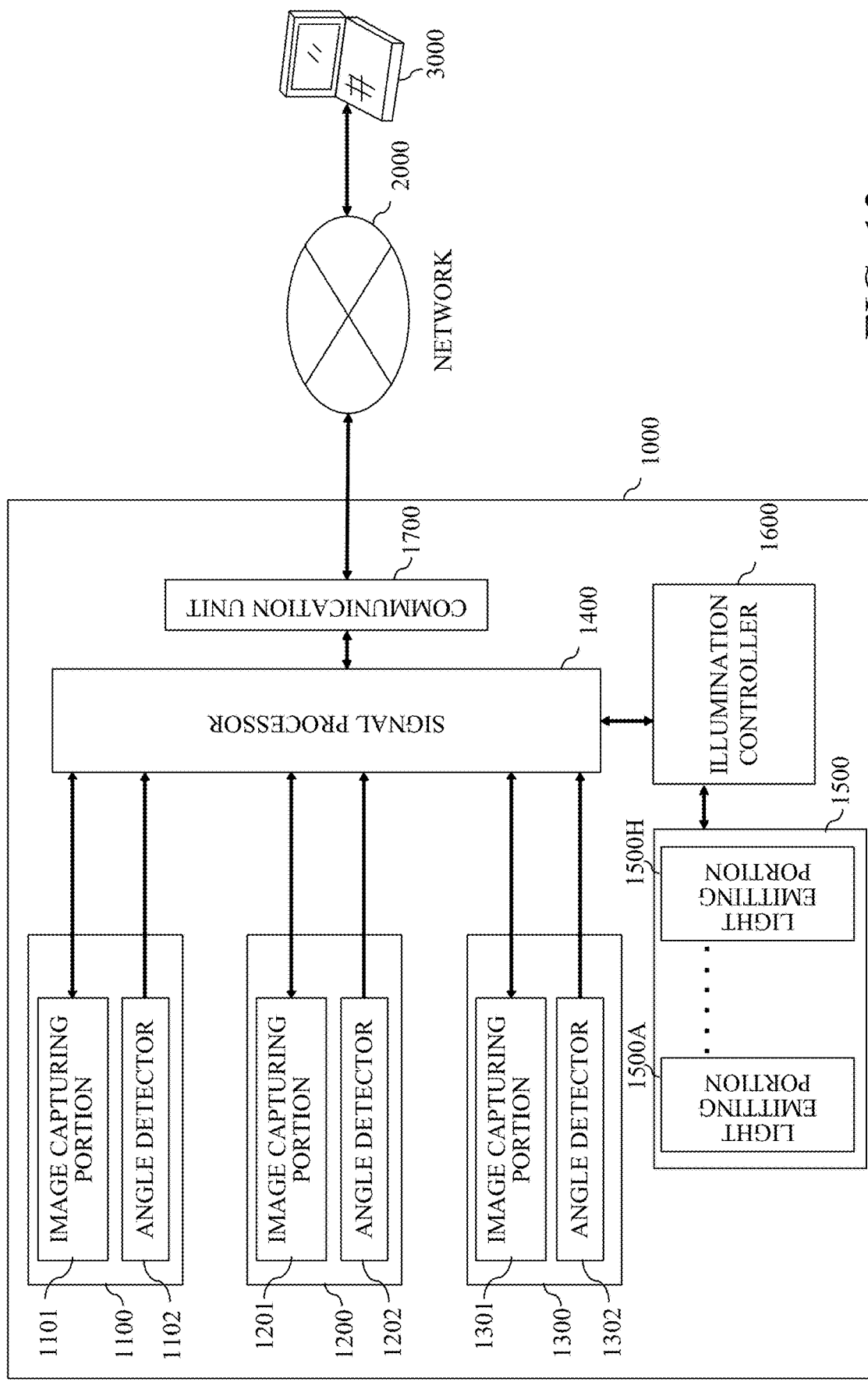
FIG. 13 is a block diagram illustrating a configuration of the image capturing apparatus, which is a third embodiment according to the present invention.

FIG. 13 illustrates a configuration of an image capturing apparatus 1000, which is a third embodiment according to the present invention. The image capturing apparatus 1000 includes a plurality of (three in this embodiment) camera units 1100, 1200 and 1300 as image capturing units, a signal processor 1400, an illumination unit 1500, an illumination controller 1600, and a communication unit 1700. The illumination unit 1500 includes a plurality of (eight in this embodiment) light emitting portions 1500A to 1500H as illumination units.

Figure 14A:
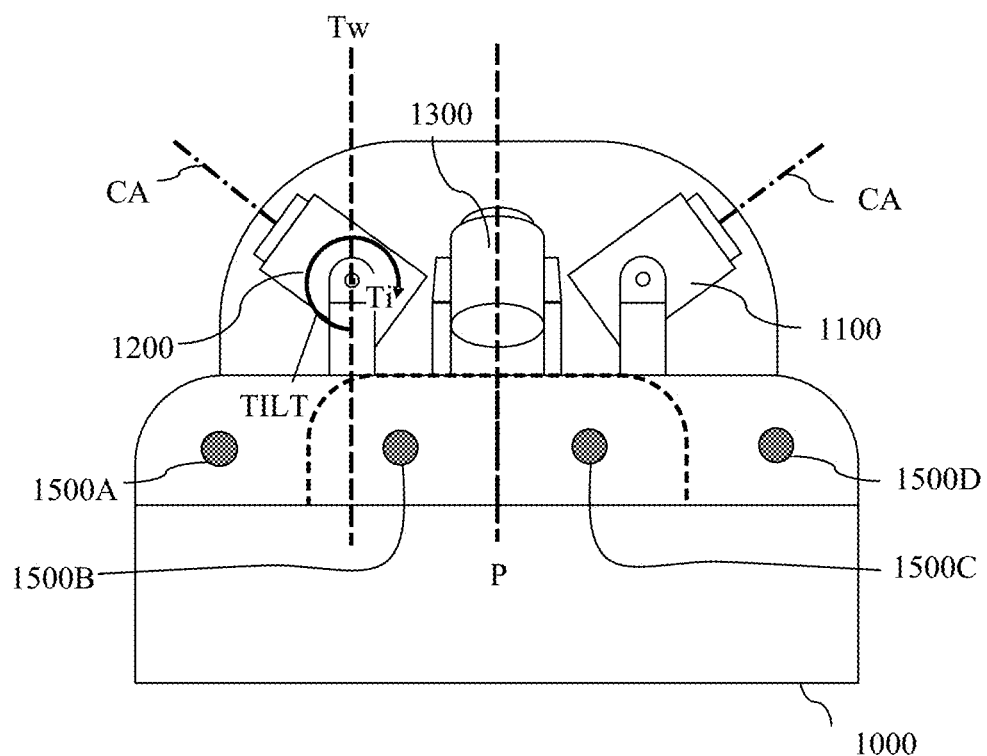
FIGS. 14A and 14B are diagrams illustrating panning, tilt and twist of a camera unit in the image capturing apparatus according to the third embodiment.
Figure 14B:
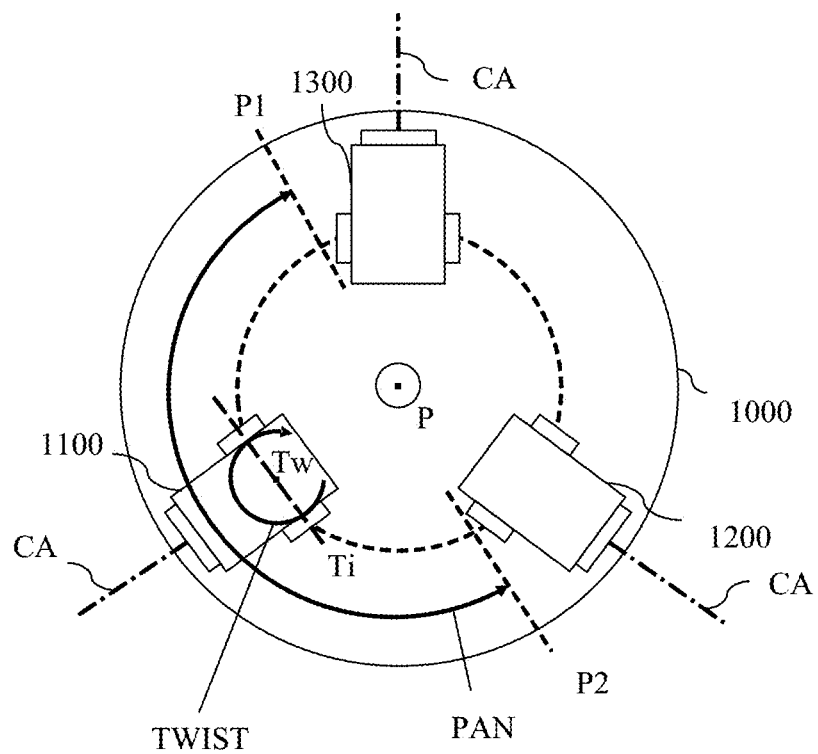

FIG. 14A is an external view illustrating the image capturing apparatus 1000 as viewed from the side. The image capturing apparatus 1000 is actually installed upside-down direction that is opposite to the direction illustrated in FIG. 14A. FIG. 14B is an external view illustrating the image capturing apparatus 1000 as viewed from the upper side (actually lower side) of FIG. 14A. The camera units 1100, 1200, and 1300 are arranged at different positions on a circle in a camera arrangement plane (horizontal plane). Each camera unit can capture an image of a range of an image capturing angle of view (hereinafter referred to as image capturing area) centered on an image capturing optical axis CA, and can change the image capturing area by changing a position (panning angle) and orientation (tilt angle and twist angle).

The panning angle indicates a position that can be changed around a P axis (first axis) passing through the center of the circle. Each camera unit can move to a position in the vicinity of a camera unit adjacent in the circumferential direction of the circle. For example, the camera unit 1100 can move in a range from P1 to P2 in FIG. 14B.

A tilt angle and twist angle indicate a tilt state around a Ti axis and a twist state around a Tw axis (second axis) in the drawing, respectively. The Ti axis is an axis parallel to the camera arrangement plane. The Tw axis is an axis orthogonal to the camera arrangement plane (that is, parallel to the P axis) located at a position closer to the camera unit than that of the P axis, and is an axis passing through the camera unit in this embodiment.

As illustrated in FIG. 13, the camera units 1100, 1200, and 1300 includes image capturing portions 1101, 1102, and 1301, respectively. Each image capturing portion includes an optical system (lens) (not illustrated) and an image sensor such as a CCD sensor or a CMOS sensor configured to capture (photoelectrically convert) an optical image formed by the optical system. The camera units 1100, 1200, and 1300 respectively include angle detectors 1102, 1202 and 1302 configured to detect panning angles, tilt angles, and twist angles of the camera units. Each angle detector is configured to detect the panning angle, tilt angle and twist angle by a rotary encoder, a photo interrupter, an angular velocity sensor or the like. Each angle detector may detect the panning angle, tilt angle and twist angle by a method such as image analysis that does not use the above sensors.

The signal processor 1400 includes a computer including a CPU and the like. The signal processor 1400 is configured to perform various image processing on each image capturing signal output from the camera units 1100, 1200, and 1300 (image capturing portions 1101, 1201, and 1301), and to generate image data. The image data is compressed by the signal processor 1400, converted into a predetermined format by the communication unit 1700, transmitted to a network 2000 by wired or wireless communication, and distributed to an information processing apparatus 3000 via the network 2000.

The information processing apparatus 3000 includes a personal computer (PC) or a workstation, and is configured to display image data received from the image capturing apparatus 1000 on a monitor. The information processing apparatus 3000 is configured to control the image capturing apparatus 1000 by transmitting a control command to the image capturing apparatus 1000 via the network 2000, the control command indicating an image capturing condition such as panning angle, tilt angle, twist angle, zooming magnification, focus position, gain, dynamic range, exposure and white balance of each camera unit. The signal processor 1400 is configured to control the image capturing portions 1101, 1201, and 1301 according to the received control command. An image capturing system includes the image capturing apparatus 1000 and the information processing apparatus 3000.

The signal processor 1400 is configured to acquire the panning angle, tilt angle and twist angle of each of the camera units 1100, 1200 and 1300 output from each of the angle detectors 1102, 1202 and 1302, and to calculate an image capturing area of each camera unit. The signal processor 1400 is configured to output an illumination control signal to the illumination controller 1600 configured to cause the illumination unit 1500 to emit light necessary for the calculated image capturing area.

Figure 15:
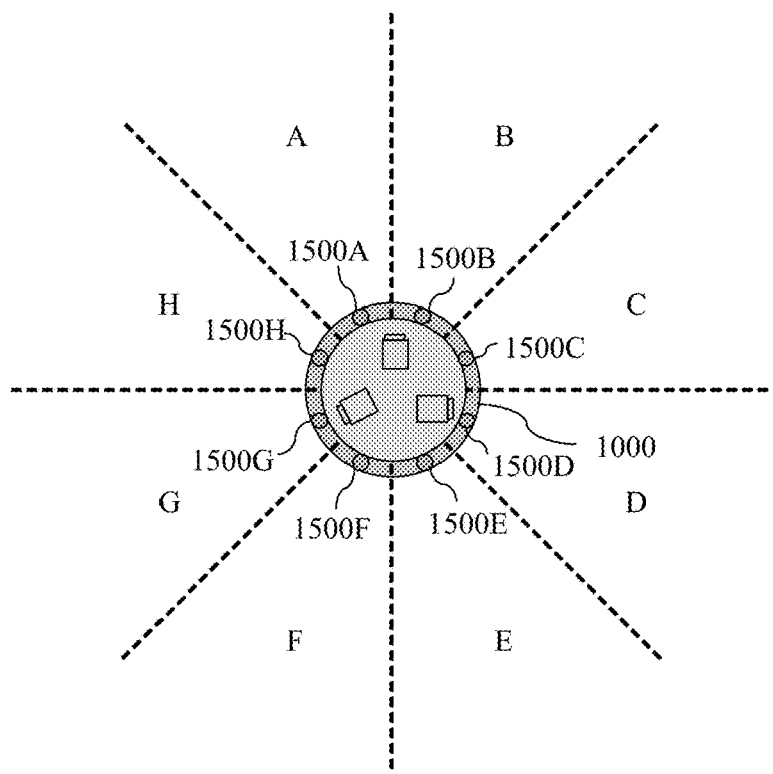
FIG. 15 is a diagram illustrating illumination areas of illumination portions according to the third embodiment.

As can be seen from FIG. 14A, the light emitting portions 1500A to 1500H of the illumination unit 1500 are arranged in parallel to the camera arrangement plane and at different positions on the circle centered on the P axis described above. Each light emitting portion includes a light emitting element such as an LED and is configured to emit the illumination light towards the image capturing area. FIG. 15 illustrates an illumination area of illumination light from light emitting portions 1500A to 1500H in a horizontal plane. The light emitting portion 1500A irradiates the illumination area A with illumination light. In the same manner, the light emitting portions 1500B to 1500H respectively irradiate the illumination areas B to H with illumination light.

The illumination controller 1600 is configured to provide control so that each of the light emitting portions 1500A to 1500H specified by the illumination control signal from the signal processor 1400 emits light at a light emission intensity specified by the illumination control signal. A control unit includes a signal processor 1400 and an illumination controller 1600.

The communication unit 1700 is configured to distribute the image data to the network 2000 as described above, and to receive information from the network 2000 and supplies it to the signal processor 1400.

Hereinafter, a description will be given of illumination control according to the twist angle (twist state) of the camera unit with reference to FIGS. 16 to 20. A description will be given for the camera unit 1100 here, but the same applies to the other camera units 1100 and 1200.

Figure 17:
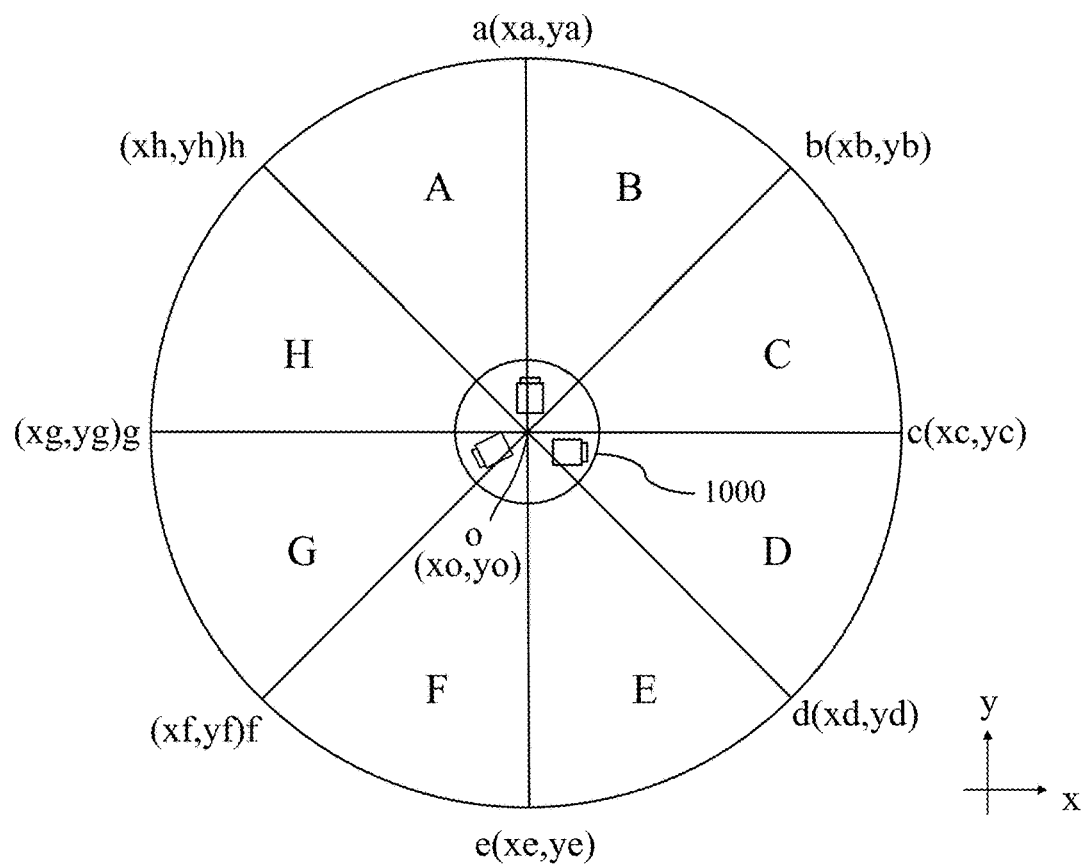
FIG. 17 is a diagram illustrating coordinates relating to an illumination area of illumination light according to the third embodiment.

FIG. 17 illustrates coordinates relating to the illumination areas of the illumination light in the horizontal plane (xy plane). In this figure, the center (P-axis position) of the circle in which the light emitting portions 1500A to 1500H are arranged is set as an origin o (xo, yo), and a large circle represents an outer edge of an illumination area, the outer edge corresponding to a reachable distance of the illumination light from each light emitting portion. On this circle, coordinates (xa, ya) is set for a point a on a boundary between illumination areas A and B which are adjacent to each other and illustrated in FIG. 15, coordinates (xb, yb) is set for a point b on a boundary between illumination areas B and C, coordinates (xc, yc) is set for a point c on a boundary between illumination areas C and D, coordinates (xd, yd) is set for a point d on a boundary between illumination areas D and E, coordinates (xe, ye) is set for a point e on a boundary between illumination areas E and F, coordinates (xf, yf) is set for a point f on a boundary between illumination areas F and G, coordinates (xg, yg) is set for a point g on a boundary between illumination areas G and H, and coordinates (xh, yh) is set for a point h on a boundary between illumination areas H and A.

Figure 18:
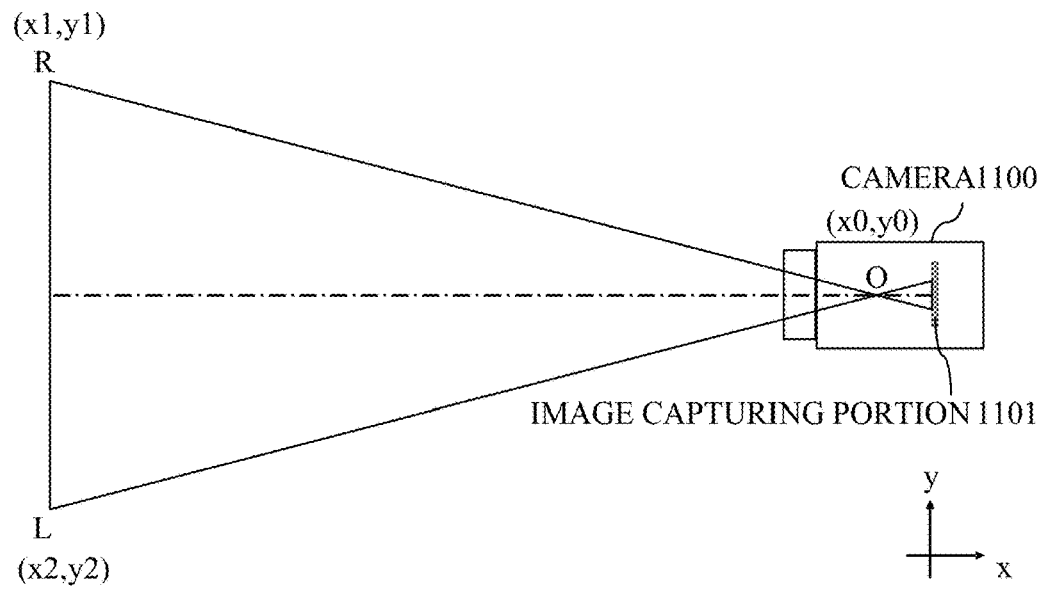
FIG. 18 is a diagram illustrating coordinates relating to an image capturing area of a camera unit according to the third embodiment.

FIG. 18 illustrates coordinates relating to the image capturing area of the camera unit 1100 in the horizontal plane (xy plane). In this drawing, the image capturing area is represented by a triangle ΔORL including a focal point O in the camera unit 1100 as an apex. Coordinates of the point O are set to (x0, y0), coordinates of the point R are set to (x1, y1), and coordinates of the point L are set to (x2, y2). The coordinates of the points R and L are set based on an F-number of the optical system of the image capturing portion 1101 and performance of the image sensor.

Figure 19A:
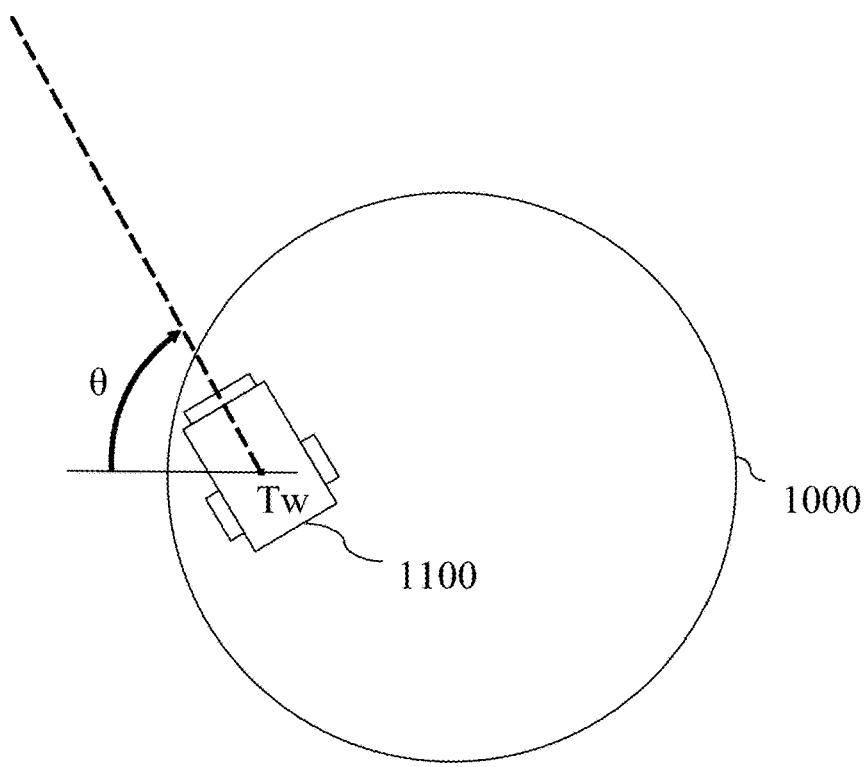
FIGS. 19A and 19B are diagrams illustrating a change in an image capturing area caused by twist of the camera unit according to the third embodiment.
Figure 19B:
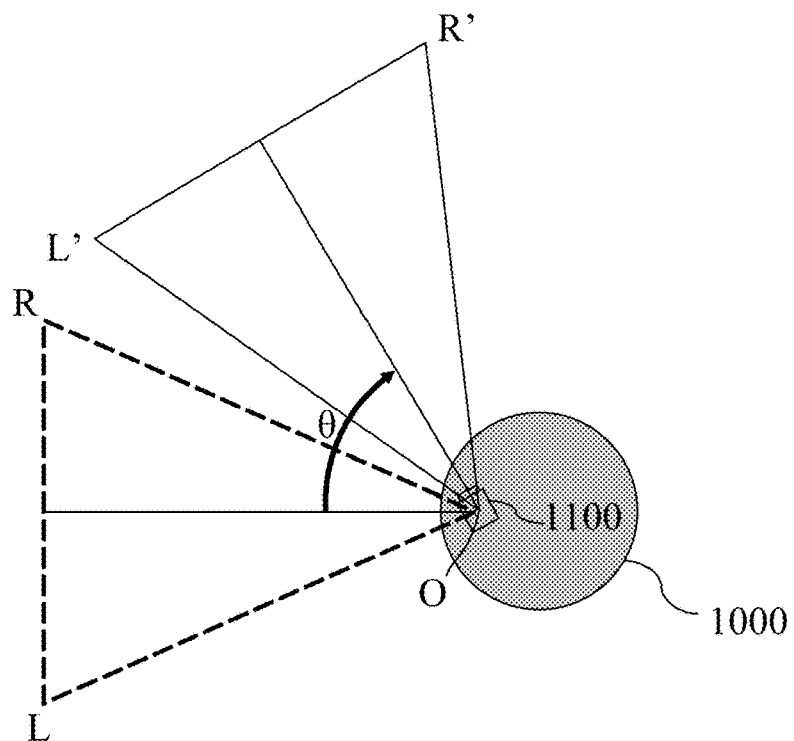

FIG. 19A illustrates a state in which the camera unit 1100 twists from an initial twist state (initial twist state: twist angle 0°) by twist angle about the Tw axis. FIG. 19B illustrates an image capturing area ΔORL in the initial twist state and an image capturing area ΔOR'L' twisted by the twist angle θ. When the camera unit 1100 twists in this way, the image capturing area also twists.

Figure 16:
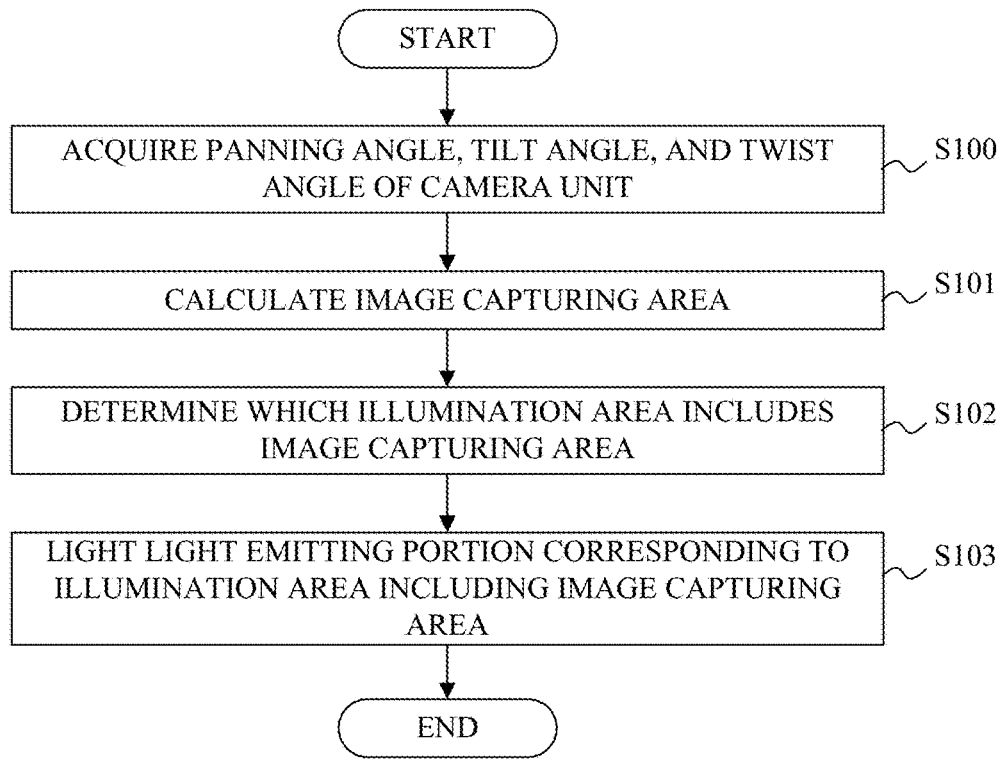
FIG. 16 is a flow chart illustrating processing performed in the image capturing apparatus according to the third embodiment.

The flow chart of FIG. 16 illustrates illumination control processing (control method) executed by the signal processor 1400 according to a computer program. The data of coordinates relating to the computer program and the illumination area and image capturing area ΔORL of the illumination light described above are stored (recorded) in a memory unit (not illustrated) in the image capturing apparatus 1000. Here, a case will be described in which the camera unit 1100 is in the initial tilt state (tilt angle 0°) in an initial panning state (initial position: panning angle 0°) and twists by the twist angle θ from the initial twist state. The illumination areas G and F of the illumination light illustrated in FIG. 15 include the image capturing area of the camera unit 1100 at the panning angle 0°, tilt angle 0°, and twist angle 0°.

In step S100, the signal processor 1400 acquires the panning angle (position), tilt angle (tilt state), and twist angle (twist state) of the camera unit 1100 from the angle detector 1102.

Subsequently, in step S101, the signal processor 1400 calculates coordinates of points R' and L' in the image capturing area ΔOR'L' of the camera unit 1100 by using the panning angle, tilt angle and twist angle θ acquired in step S100. The coordinates of the points R' and L' at the panning angle 0°, tilt angle 0° and twist angle θ are calculated by expressions (1) and (2), respectively.

$$R'(x1\cos\theta - y1\sin\theta + x0,\ x1\sin\theta + y1\cos\theta + y0) \quad (1)$$

$$L'(x2\cos\theta - y2\sin\theta + x0,\ x2\sin\theta + y2\cos\theta + y0) \quad (2)$$

Figure 20:
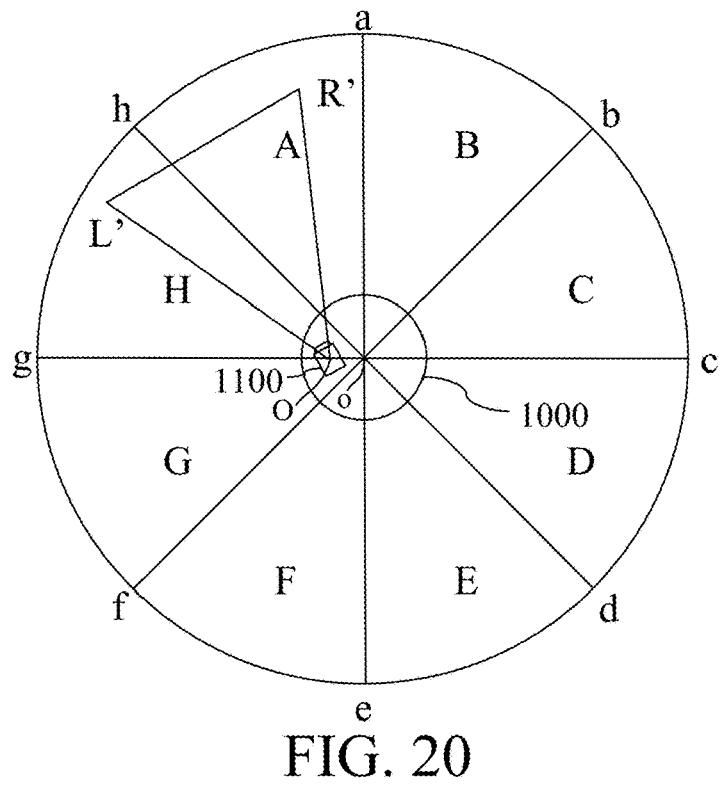
FIG. 20 is a diagram illustrating the illumination area and the image capturing area according to the third embodiment.

Subsequently, in step S102, the signal processor 1400 determines which illumination area includes the image capturing area ΔOR'L' among the illumination areas A to H of the illumination light whose coordinates (FIG. 17) are stored in the memory in advance, by using the coordinates of the points R' and L' calculated in step S101. FIG. 20 illustrates a relationship between the image capturing area ΔOR'L' and the illumination areas A to H. As can be seen from this figure, the signal processor 1400 determines that the image capturing area ΔOR'L' is included in the illumination areas A and H.

Subsequently, in step S103, the signal processor 1400 outputs an illumination control signal to the illumination controller 1600, for lighting the light emitting portions 1500A and 1500H corresponding to the illumination areas A and H determined in step S102. When receiving this illumination control signal, the illumination controller 1600 light the light emitting portions 1500A and 1500H and makes them emit light. Thereby, the entire area of the image capturing area ΔOR'L' is irradiated with the illumination light from the light emitting portions 1500A and 1500H.

Although this embodiment has described a case where the camera unit performs only twist, in a case where the camera unit further performs panning and tilt, the signal processor 1400 similarly provide control for lighting a light emitting portion corresponding to an illumination area including an image capturing area after panning, tilting and twisting.

According to this embodiment, it is possible to properly irradiate the image capturing area of the camera unit after twisting or the like with illumination light.

Fourth Embodiment

A description will be given of illumination control according to a fourth embodiment of the present invention with reference to FIGS. 21 to 25. Configurations of an image capturing apparatus in this embodiment are the same as those in the third embodiment. In this embodiment, a case will be described in which two of three camera units 1100, 1200, and 1300 (here, camera unit 1100 and camera unit 1200 are used as examples) twist from the initial twist states, and parts of image capturing areas of those two camera units overlaps.

Figure 22A:
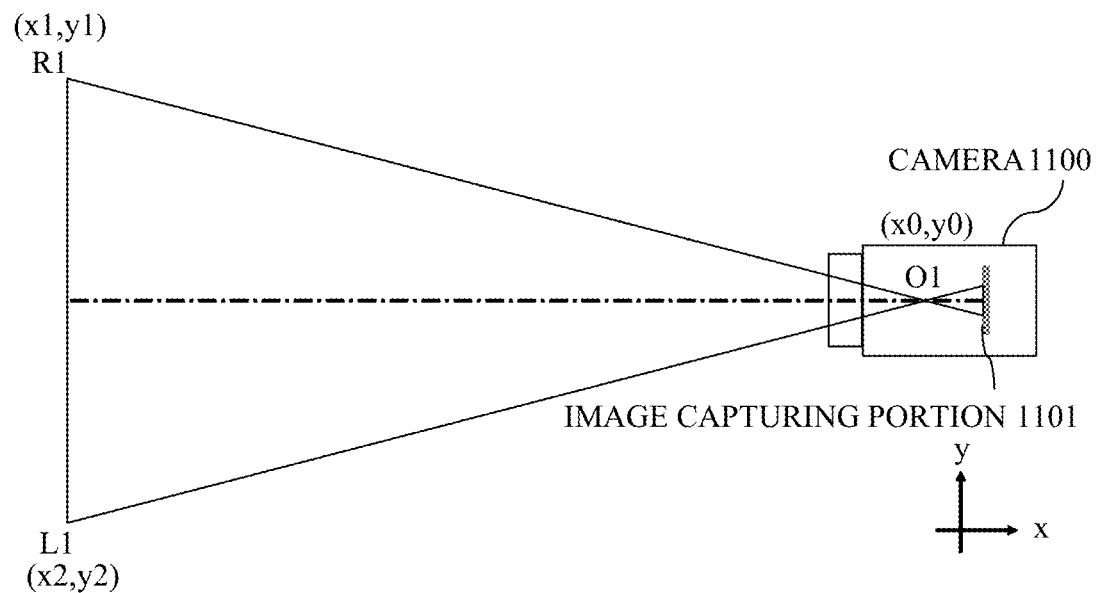
FIGS. 22A and 22B are diagrams illustrating coordinates relating to an image capturing area of a camera unit according to the fourth embodiment.
Figure 22B:
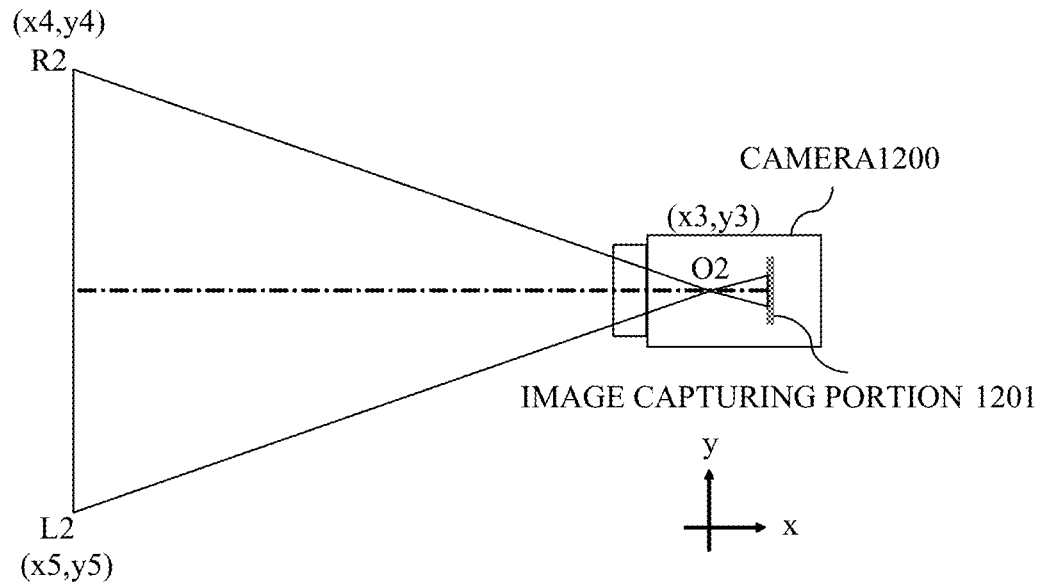

Coordinates relating to illumination areas A to H of illumination light in a horizontal plane (xy plane) in this embodiment are as illustrated in FIG. 17. FIGS. 22A and 22B respectively illustrate coordinates relating to the image capturing areas of the camera units 1100 and 1200 in the horizontal plane (xy plane). In these drawings, the image capturing area of the camera unit 1100 is represented by a triangle ΔO1R1L1 having a focal point O1 in the camera unit 1100 as an apex, and the image capturing area of the camera unit 1200 is represented by a triangle ΔO2R2L2 having a focal point O2 in the camera unit 1200 as an apex. Coordinates of the point O1 are set to (x0, y0), coordinates of the point R1 are set to (x1, y1), and coordinates of the point L1 are set to (x2, y2). Coordinates of the point O2 are set to (x3, y3), coordinates of the point R2 are set to (x4, y4), and coordinates of the point L2 are set to (x5, y5). Coordinates of the points R1 and R2 and the points L1 and L2 are set based on an F-number of an optical system of image capturing portions 1101 and 1201 and performance of an image sensor.

Figure 23A:
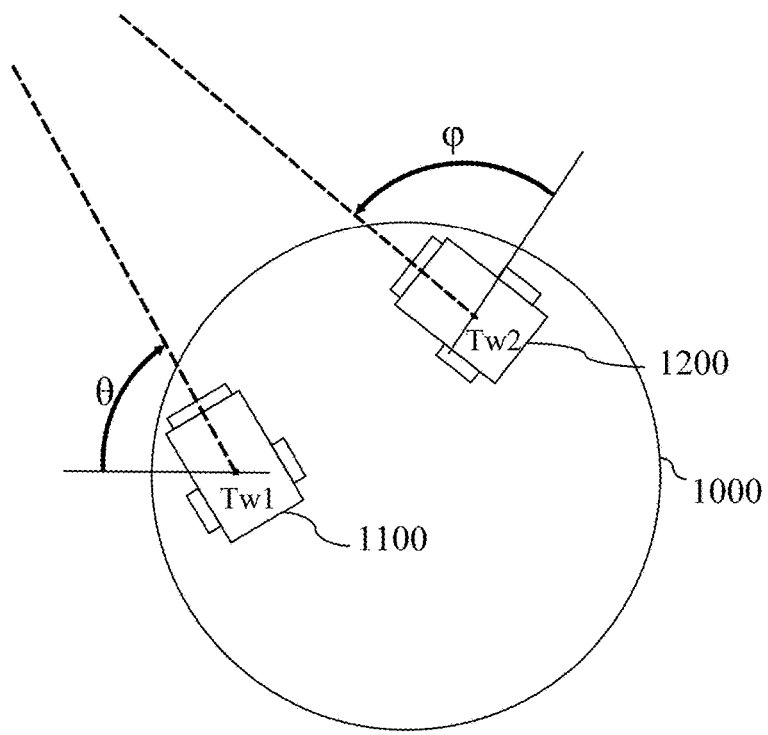
FIGS. 23A and 23B are diagrams illustrating changes in the image capturing area caused by twist of the camera according to the fourth embodiment.
Figure 23B:
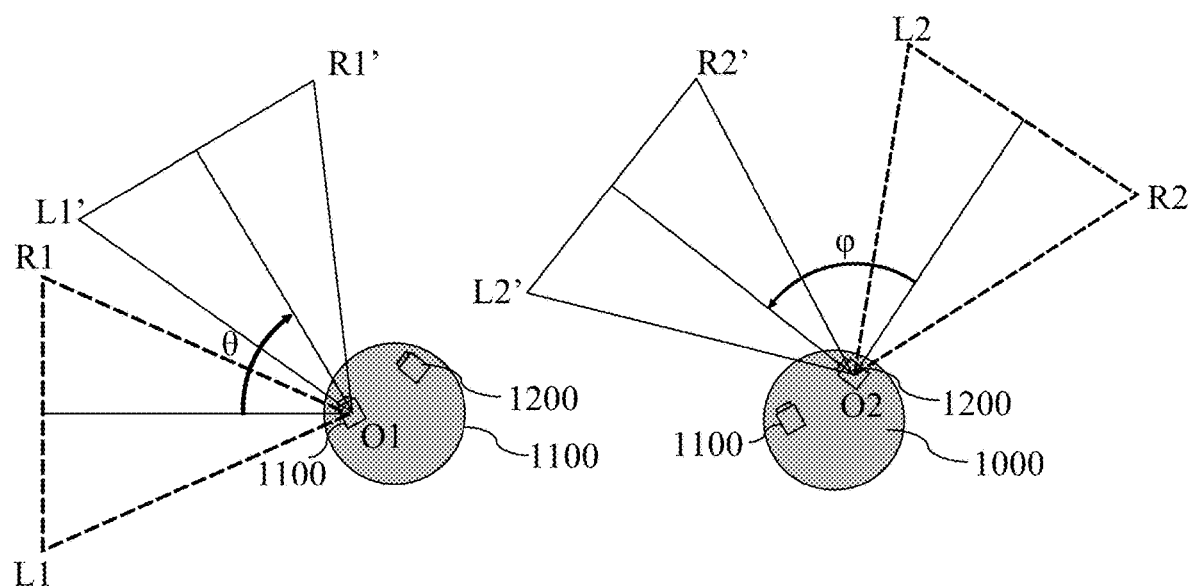

FIG. 23A illustrates a state in which the camera unit 1100 and the camera unit 1200 twist from initial twist states (0°) around Tw1 and Tw2 axes by twist angles θ and φ, respectively. FIG. 23B illustrates the image capturing areas ΔO1R1L1 and ΔO2R2L2 in the initial twist state of the camera units 1100 and 1200, and image capturing areas ΔO1R1'L1' and ΔO2R2'L2' as states where those areas twist by twist angles θ and φ, respectively.

In this embodiment, a required illumination light amount is set for each camera unit according to the F-number of the optical system and the performance of the image sensor. Here, when a maximum amount of light is 100% in the illumination area of the illumination light from each light emitting portion, the required illumination light amount of the camera unit 1100 is assumed to be 100%, and the required illumination light amount of the camera unit 1200 is assumed to be 80%. These required illumination light amounts are examples, and may be other required illumination light amounts.

Figure 21:
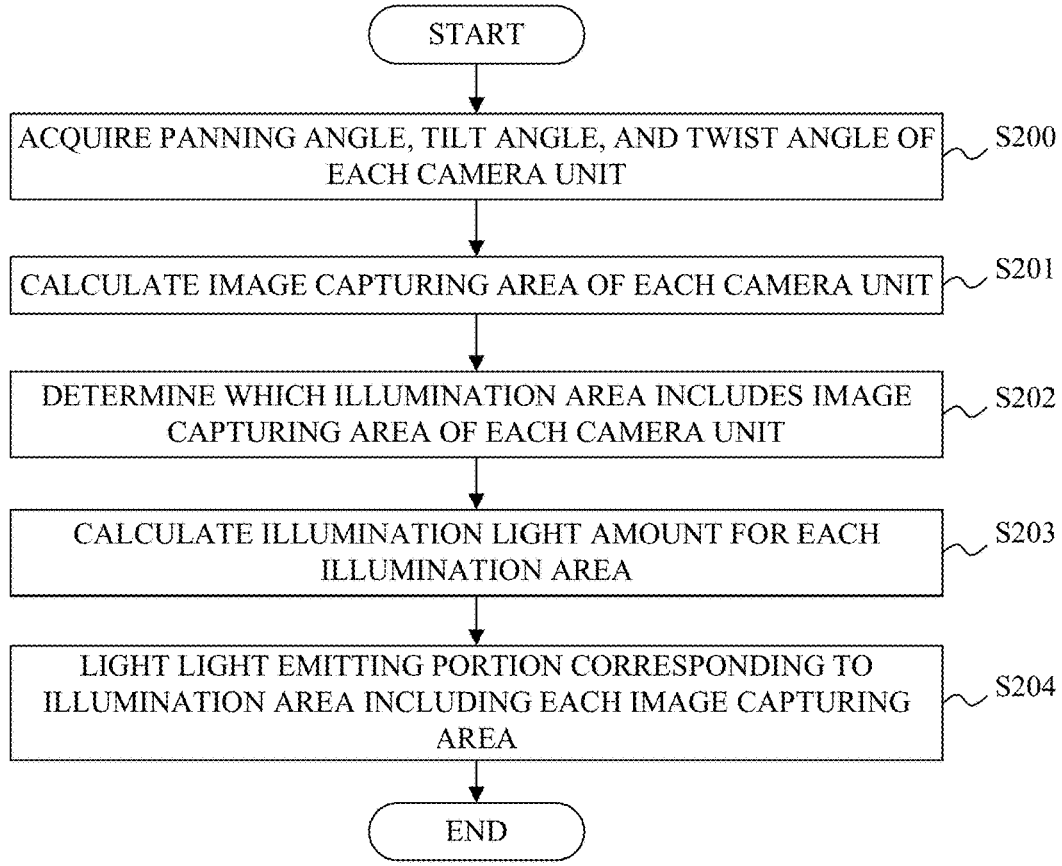
FIG. 21 is a flow chart illustrating processing performed in an image capturing apparatus, which is a fourth embodiment according to the present invention.

The flow chart in FIG. 21 illustrates illumination control processing (control method) executed by the signal processor 1400 according to a computer program. The computer program and above-described coordinate data of the illumination areas of the illumination light and image capturing areas are stored in a memory (not illustrated) in the image capturing apparatus 1000. Here, a case will be described where the camera units 1100 and 1200 are in initial tilt states (tilt angle 0°) in initial panning states (panning angle 0°) and respectively twist by twist angles θ and φ from the initial twist states. At panning angle 0°, tilt angle 0° and twist angle 0°, the image capturing area of the camera unit 1100 is included in the illumination areas G and F of the illumination light illustrated in FIG. 15, and the image capturing area of the camera unit 1200 is included in the illumination areas A and B.

In step S200, the signal processor 1400 acquires the panning angles (positions), tilt angles (tilting states) and twist angles (twist states) of the camera units 1100 and 1200 from the angle detectors 1102 and 1202.

Subsequently, in step S201, the signal processor 1400 calculates the coordinates of the points R1' and L1' in the image capturing area ΔO1R1'L1' of the camera unit 1100 and the coordinates of the points R2' and L2' in the mage capturing area ΔO2R2'L2' of the camera unit 1200, by using the panning angles, tilt angles, and twist angles acquired in step S200. The coordinates of the points R1', L1', R2', and L2' at the panning angle 0°, tilt angle 0°, and twist angles θ, φ are calculated by using expressions (3) to (6), respectively.

$$R1'(x1\cos\theta - y1\sin\theta + x0, x1\sin\theta + y1\cos\theta + y0) \quad (3)$$

$$L1'(x2\cos\theta - y2\sin\theta + x0, x2\sin\theta + y2\cos\theta + y0) \quad (4)$$

$$R2'(x4\cos\varphi - y4\sin\varphi + x3, x4\sin\varphi + y4\cos\varphi + y3) \quad (5)$$

$$L2'(x5\cos\varphi - y7\sin\varphi + x4, x5\sin\varphi + y5\cos\varphi + y3) \quad (6)$$

Figures 24, 25:
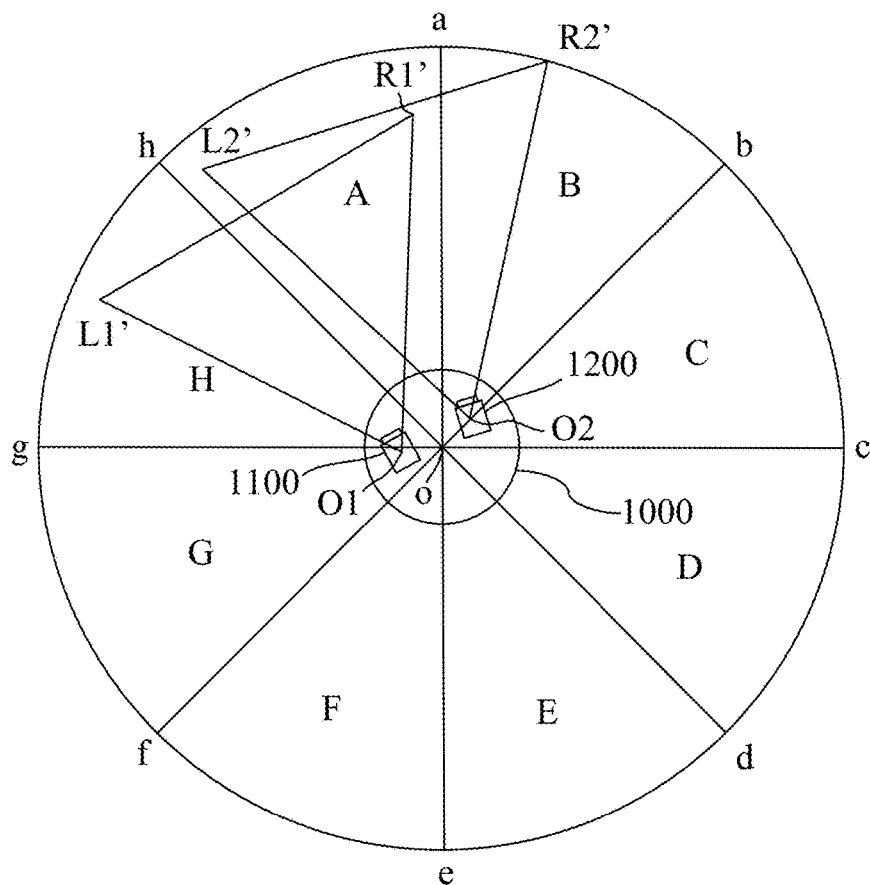
FIG. 24 is a diagram illustrating illumination areas of illumination light and image capturing areas according to the fourth embodiment.
FIG. 25 is a diagram illustrating required illumination light amounts according to the fourth embodiment.

Subsequently, in step S102, the signal processor 1400 determines which illumination areas include the image capturing area ΔO1R1'L1' and the image capturing area ΔO2R2'L2' among the illumination areas A to H of the illumination light whose coordinates (FIG. 17) are stored in the memory in advance, by using the coordinates of the points R1' and R1' and the points L1' and L2' calculated in step S101. FIG. 24 illustrates relationships between the image capturing areas ΔO1R1'L1' and ΔO2R2'L2' and the illumination areas A to H. In a case illustrated in the drawing, the signal processor 1400 determines that the image capturing area ΔO1R1'L1' is included in the illumination areas A and H and the image capturing area ΔO2R2'L2' is included in the illumination areas A and B.

Subsequently, in step S203, the signal processor 1400 determines the amounts of illumination light in the illumination areas including the image capturing areas ΔO1R1'L1' and ΔO2R2'L2', respectively. FIG. 25 illustrates the required illumination light amounts of the camera units 1100 and 1200 in the illumination areas H, A and B. The required illumination light amounts of the camera unit 1100 in the illumination areas H and A are 100% and 80%, respectively, and the required illumination light amounts of the camera unit 1200 in the illumination areas A and B are 80% and 100%, respectively. The data of such required illumination light amounts is stored in advance in the above-mentioned memory. Based on the required illumination light amounts, the signal processor 1400 sets the illumination light amount in the illumination area H to 100% and the illumination light amount in the illumination area B to 80%. For illumination area A where the image capturing areas of camera units 1100 and 1200 overlap, the larger required illumination light amount is prioritized and thus the illumination light amount is set to 100%. For the illumination area where the image capturing area overlaps, the amount of illumination light may be set properly.

Subsequently, in step S204, the signal processor 1400 outputs an illumination control signal to the illumination controller 1600, the illumination control signal being used for lighting the light emitting portions 1500A, 1500B, and 1500H, that correspond to the illumination areas A, B, and H and that are determined in step S202, with light emission intensities at which the illumination light amounts set in step S204 can be obtained. When receiving the illumination control signal, the illumination controller 1600 lights the light emitting portions 1500A, 1500B, and 1500H to control the light emission intensities. Thereby, entire areas of the image capturing area ΔO1R1'L1' and the image capturing area ΔO2R2'L2' are irradiated with the illumination light from the light emitting portions 1500A, 1500B, and 1500H at the set illumination light amount.

Although this embodiment has described a case where two camera units perform only twist, in a case when these camera units further perform panning and tilt, the signal processor 1400 similarly controls the light emission intensities by lighting light emitting portions corresponding to illumination areas including image capturing areas after panning, tilt and twist. When the three camera units perform twist and the like, the signal processor 1400 performs the same control.

According to this embodiment, it is possible to properly irradiate an image capturing area of a plurality of camera units which has twisted and the like with illumination light.

In each of the above third and fourth embodiments, a description has been given of an image capturing apparatus having three camera units capable of twist or the like, but the third and fourth embodiments of the present invention also include an image capturing apparatus having at least one camera unit capable of twist or the like.

According to the above third and fourth embodiments, in an image capturing apparatus having a plurality of image capturing units and a plurality of illumination units, it is possible to properly irradiate an image capturing area with illumination light from an illumination unit, even if a position and twist state of the image capturing units change.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-026028, filed on Feb. 19, 2020, and 2020-026027, filed on Feb. 19, 2020, each of which is hereby incorporated by reference herein in its entirety.

What is claimed is:

1. An image capturing apparatus comprising:
    a plurality of image capturing units arranged on a circle centered on a first axis, and configured to change a first rotation angle about the first axis, each of the plurality of image capturing units being configured to change a second rotation angle about a second axis that is parallel to the first axis and closer to the respective image capturing unit than the first axis;
    a plurality of illumination units configured to emit illumination light in different directions; and
    a memory storing instructions; and
    a hardware processor that executes the instructions to:
        determine an illumination area based on the first rotation angle about the first axis and the second rotation angle about the second axis; and
        control the plurality of illumination units based on the determined illumination area.

2. The image capturing apparatus according to claim 1, wherein the hardware processor, in controlling the plurality of illumination units:
    selects emission/non-emission of each of the plurality of illumination units for each of two or more image capturing units to perform image capturing among the plurality of image capturing units; and
    selects, from among the plurality of illumination units, an illumination unit to emit light according to a logical sum of emission/non-emission of each of the plurality of illumination units.

3. The image capturing apparatus according to claim 1, wherein:
    each of the plurality of image capturing units includes a zooming function for performing zooming of an optical system, and
    the hardware processor, in controlling the plurality of illumination units, selects, from among the plurality of illumination units, an illumination unit to emit light for an image capturing unit, among the plurality of image capturing units, that has performed zooming, according to a zooming state.

4. The image capturing apparatus according to claim 1, wherein the hardware processor, in controlling the plurality of illumination units, selects, from among the plurality of illumination units, an illumination unit to emit light for an image capturing unit, from among the plurality of image capturing units, whose image capturing area is selected by a user, according to the selected image capturing area.

5. The image capturing apparatus according to claim 1, wherein the hardware processor, in controlling the plurality of illumination units:
    acquires the first rotation angle about the first axis of at least one of the plurality of image capturing units; and
    selects, from among the plurality of illumination units, an illumination unit to emit light for the at least one of the plurality of image capturing units so that the illumination light is emitted to an image capturing area that changes according to the first rotation angle about the first axis and the second rotation angle about second axis.

6. The image capturing apparatus according to claim 1, wherein:
    each of the plurality of illumination units is configured to change a light emitting direction of the illumination light, and
    the hardware processor, in controlling the plurality of illumination units selects, from among the plurality of illumination units, an illumination unit to emit light according to the light emitting direction of each of the plurality of illumination units.

7. The image capturing apparatus according to claim 1, wherein the hardware processor, in determining the illumination area:
    calculates coordinates relating to an image capturing area of an image capturing unit, among the plurality of image capturing units, according to the first rotation angle about the first axis and the second rotation angle about the second axis; and
    determines the image capturing area using the calculated coordinates relating to the image capturing area and coordinates relating to an illumination area of each of the plurality of illumination units.

8. The image capturing apparatus according to claim 1, the memory stores coordinates relating to an image capturing area of each of the plurality of image capturing units at a time when the respective image capturing unit is at an initial first rotation angle about the first axis and an initial second rotation angle about the second axis, and coordinates relating to an illumination area of each of the plurality of illumination units.

9. The image capturing apparatus according to claim 1, wherein the plurality of illumination units are arranged at different positions on the circle centered on the first axis.

10. The image capturing apparatus according to claim 1, wherein the hardware processor, in controlling the plurality of illumination units, controls light emission intensities of the plurality of illumination units according to a required illumination light amount of each of the plurality of image capturing units.

11. The image capturing apparatus according to claim 10, wherein:

the plurality of image capturing units include a first image capturing unit and a second image capturing unit, which are arranged at different positions from each other, the hardware processor, in controlling the plurality of illumination units, controls light emission intensities of the plurality of illumination units according to a larger required illumination light amount of a required light amount of the first image capturing unit and a required illumination light amount of the second image capturing unit, for an illumination area of each of the plurality of illumination units where the image capturing area of the first image capturing unit and the image capturing area of the second image capturing unit overlap.

12. A control method for an image capturing apparatus including a plurality of image capturing units arranged on a circle centered on a first axis, and configured to change a first rotation angle about the first axis, each of the plurality of image capturing units being configured to change a second rotation angle about a second axis that is parallel to the first axis and closer to the respective image capturing unit than the first axis, and a plurality of illumination units configured to emit illumination light in different directions, the control method comprising the steps of:

determining an illumination area based on the first rotation angle about the first axis and the second rotation angle about the second axis; and controlling the plurality of illumination units based on the determined illumination area.

13. A non-transitory computer-readable storage medium storing a computer program executable by a computer of an image capturing apparatus, including a plurality of image capturing units arranged on a circle centered on a first axis, and configured to change a first rotation angle about the first axis, each of the plurality of image capturing units being configured to change a second rotation angle about a second axis that is parallel to the first axis and closer to the respective image capturing unit than the first axis, and a plurality of illumination units configured to emit illumination light in different directions, to execute a control method comprising the steps of:

determining an illumination area based on the first rotation angle about the first axis and the second rotation angle about the second axis; and controlling the plurality of illumination units based on the determined illumination area.

* * * * *